United States Patent
Pfeiffer et al.

(10) Patent No.: US 6,798,944 B2
(45) Date of Patent: Sep. 28, 2004

(54) FIBER OPTIC CIRCUIT AND MODULE WITH SWITCH

(75) Inventors: Greg C. Pfeiffer, Bloomington, MN (US); Todd P. Knettel, Shakopee, MN (US); Michael Nystrom, St. Paul, MN (US); Jorge A. Cano, Shakopee, MN (US)

(73) Assignee: Alcon Technologies, Inc., Shakopee, MN (US)

( * ) Notice: Subject to any disclaimer, the term of this patent is extended or adjusted under 35 U.S.C. 154(b) by 0 days.

(21) Appl. No.: 10/425,903

(22) Filed: Apr. 28, 2003

(65) Prior Publication Data

US 2003/0206687 A1 Nov. 6, 2003

Related U.S. Application Data

(63) Continuation of application No. 10/021,979, filed on Dec. 17, 2001, now Pat. No. 6,556,738, which is a continuation of application No. 09/344,224, filed on Jun. 25, 1999, now Pat. No. 6,370,294.

(51) Int. Cl.$^7$ .................................................. G02B 6/42
(52) U.S. Cl. .............................. 385/22; 385/16; 385/20
(58) Field of Search ........................ 385/16–24; 398/45, 398/59, FOR 108, FOR 109, FOR 110, FOR 119, FOR 130; 370/252, 474

(56) References Cited

U.S. PATENT DOCUMENTS

| | | | |
|---|---|---|---|
| 4,887,309 A | 12/1989 | Andersson et al. | ......... 455/601 |
| 5,046,811 A | 9/1991 | Jung et al. | .................... 385/15 |
| 5,212,761 A | 5/1993 | Petrunia | ..................... 385/135 |
| 5,251,001 A | 10/1993 | Dave et al. | ................. 356/73.1 |
| 5,305,405 A | 4/1994 | Emmons et al. | ............... 385/73 |
| 5,363,465 A | 11/1994 | Korkowski et al. | ......... 385/135 |
| 5,432,875 A | 7/1995 | Korkowski et al. | ........... 385/27 |
| 5,552,881 A | 9/1996 | Jezwinski et al. | ......... 356/73.1 |
| 5,708,753 A | 1/1998 | Frigo et al. | ................. 385/147 |
| 5,712,942 A | 1/1998 | Jennings et al. | ............ 385/134 |
| 5,757,527 A | 5/1998 | Mock | .......................... 359/117 |
| 5,774,245 A | 6/1998 | Baker | ......................... 359/128 |
| 5,790,285 A | 8/1998 | Mock | .......................... 359/110 |
| 5,793,481 A | 8/1998 | Leali | ......................... 356/73.1 |
| 5,793,909 A | 8/1998 | Leone et al. | .................. 385/24 |
| 5,978,113 A | 11/1999 | Kight | ......................... 359/110 |
| 6,370,294 B1 * | 4/2002 | Pfeiffer et al. | ................. 385/16 |

FOREIGN PATENT DOCUMENTS

WO     WO 97/01897     1/1997     ............. H04J/3/08

* cited by examiner

*Primary Examiner*—Phan T. H. Palmer
(74) *Attorney, Agent, or Firm*—Nawrocki, Rooney & Sivertson, P.A.

(57) ABSTRACT

A method of monitoring fiber optic circuits. Included is manipulating a first switch between a first state, with first connection points optically linked along a first optical signal pathway and second connection points optically linked along a second optical signal pathway, and a second loopback state, with the first and second connection points of a first pair of connection locations in communication along a path along a portion of the first and second optical signal pathways. With the first switch in the first state, a third pair of connection locations are linked to the first optical pathway and the optical throughout observed. The third pair of connection locations are then linked to the second optical pathway and the optical throughout observed. These steps are repeated as long as the first and second optical pathways transmit the optical throughout normally.

6 Claims, 38 Drawing Sheets

FIG. 32 Loopback Mode (TAP Loopback)

FIBER OPTIC CIRCUIT AND MODULE WITH SWITCH

This is a continuation of application Ser. No. 10/021,979 filed on Dec. 17, 2001, now U.S. Pat. No. 6,556,738 which is a continuation of application Ser. No. 09/344,224, filed on Jun. 25, 1999, now U.S. Pat. No. 6,370,294.

FIELD OF THE INVENTION

The present invention relates to fiber optic circuits and modules for fiber optic equipment.

BACKGROUND OF THE INVENTION

The telecommunications and data transmission industries are rapidly expanding their development of fiber optic transmission systems. Historically, telecommunications signals and data have been transmitted over wire lines such as twisted pair or coaxial cables. In order to accommodate higher signal rate speeds, the industry is turning to increased use of fiber optic cables as the transmission medium.

As the use of fiber optic cables increases, the need for peripheral equipment has increased. For example, it is desirable to have access to a fiber optic line for the purpose of either re-routing the line in the event of damage to the line or to have access to the line for the purposes of monitoring or testing the line.

Fiber optic peripheral equipment for cable management, cable storage, and connection capabilities are well known. The use of modular fiber optic connector modules is known for performing so-called cross-connect applications. U.S. Pat. Nos. 5,432,875 and 5,363,465 to ADC Telecommunications, Inc. concern fiber optic connector modules and chassis designs for receiving the modules in cross-connect applications.

There is a continuing need for fiber optic circuits and systems which provide optical signal routing, monitoring, and access capabilities.

SUMMARY OF THE INVENTION

The present invention includes an optical circuit for connecting fiber optic cables and/or equipment, including one or more switches in the optical circuit for changing the optical signal paths of the circuit. The switch or switches can be used to selectively link the optical signal paths to access terminals, such as for signal testing, monitoring or re-routing. The optical circuit may allow for one or more of the following functions for signals passing through the circuit: passing through of the signals, non-intrusive monitoring of the signals, looping back of the signals between the transmit and receive terminals, and splitting of the signals, such as in combination with test equipment.

One circuit of the present invention includes two optical signal pathways and a switch between the two signal pathways allowing normal pass through of the signals along each signal pathway in one state, and looping back of the signals in a second state. Access to one or both of the signal pathways can be provided to the circuit by non-intrusive monitors, or switches, such as 1×2 switches or 2×2 switches.

Remote control of the one or more switches in the optical circuits of the present invention allows for remote test access, in one preferred system.

The optical circuits of the present invention can be housed in one or more housings, as desired. Modular housings allow for convenient assembly, use and maintenance of the system.

In accordance with the invention, one preferred embodiment includes one or more fiber optic modules which are mountable to a chassis for holding one or more modules. Each module may have a plurality of connection locations for coupling to fiber optic connectors. The connection locations are linked together by optical couplers within the module. Telecommunications cables and equipment are connected to first sets of the connection locations of the modules. The modules may be used to cross-connect fiber optic equipment via patch cords between second sets of the connection locations, or the second sets of the connection locations may be connected together within a single module.

One preferred embodiment of the fiber optic module of the present invention includes a first pair of adapters for connection to fiber optic connectors and a second pair of adapters for connection to further fiber optic connectors. The first and second pairs of adapters are connected by fiber optic signal pathways through the module. One adapter of each pair may define a transmit signal port, and the other adapter of each pair may define a receive signal port. The first pair of adapters may be connected to a cable entering a customer's facility. The second pair of adapters may be cross-connected to another module at the customer's facility, or the adapters may be connected to other fiber optic equipment.

One preferred embodiment of the fiber optic module includes a first switch between the first and second signal pathways wherein both pathways are in a straight pass through configuration when the switch is in a first state, and wherein both pathways are linked to form two loop back pathways through the module when the switch is in a second state. One preferred embodiment includes a 2×2 optical switch.

One further preferred embodiment of a fiber optic module includes a third pair of adapters, such as for use in connecting to test or access equipment. A second switch links the third pair of adapters to either the transmit signal pathway or the receive signal pathway. The second switch has at least two states, wherein a first state of the second switch optically links one adapter of the third pair to the other adapter of the third pair in a loop back configuration. A second state of the second switch optically links one adapter of the third pair of adapters to one of the adapters of the first pair, and the other adapter of the third pair is optically linked to the first switch. Splitters and monitor ports may be linked to the transmit and receive signal pathways in preferred embodiments.

In an alternative preferred embodiment, a single additional adapter may be provided, instead of the third pair of adapters, and a single 1×2 optical switch provided in either the transmit or receive signal pathways. The 1×2 switch optically isolates the third adapter in one state, and optically links the additional adapter to the first switch when the 1×2 switch is in a second state. Splitters and monitor ports may be linked to the transmit and receive signal pathways in preferred embodiments.

Further embodiments of the invention include an optical circuit including first and second pairs of connection locations, each pair defining a transmit signal connection location and a receive signal connection location. The transmit signal connection location of each pair is optically linkable through a signal path to the receive signal connection location of the other pair. One or more access connection locations are provided which are linkable to one of the signal paths through the circuit. One or more switches may be provided to selectively link the access connection location(s) to one of the signal paths. A first switch, such as a 2×2 switch, between the signal paths, and a second switch, such as a 1×2 or a 2×2 switch between one of the signal paths and the access connection location(s) are provided. The first and second pairs of connection locations defining the transmit and receive signal connection locations may be part of a single module or housing construction in a frame, rack or chassis, or they may be part of separate modules or housing constructions cross-connected together through optical signal pathways, such as patch cords or other optical links.

The circuits of the present invention may be used in a variety of applications, such as for looping back of signals, or for splitting signals in combination with test equipment.

BRIEF DESCRIPTION OF THE DRAWINGS

In the drawings, wherein like reference letters and numerals indicate corresponding elements throughout the several views.

DETAILED DESCRIPTION OF THE PREFERRED EMBODIMENTS

Figure 1:
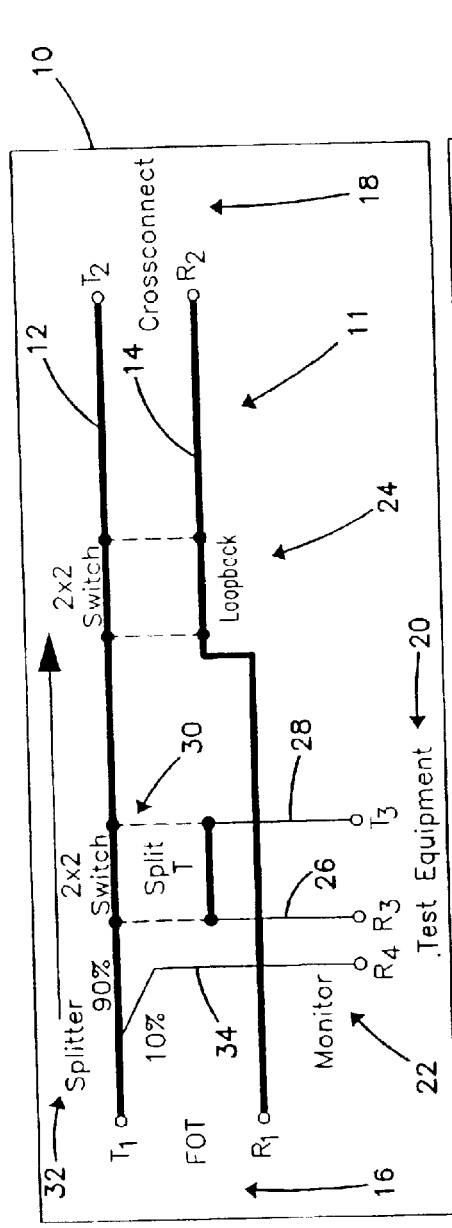
FIG. 1 is a schematic diagram of a first embodiment of a fiber optic access module in accordance with the present invention.
Figure 1A:
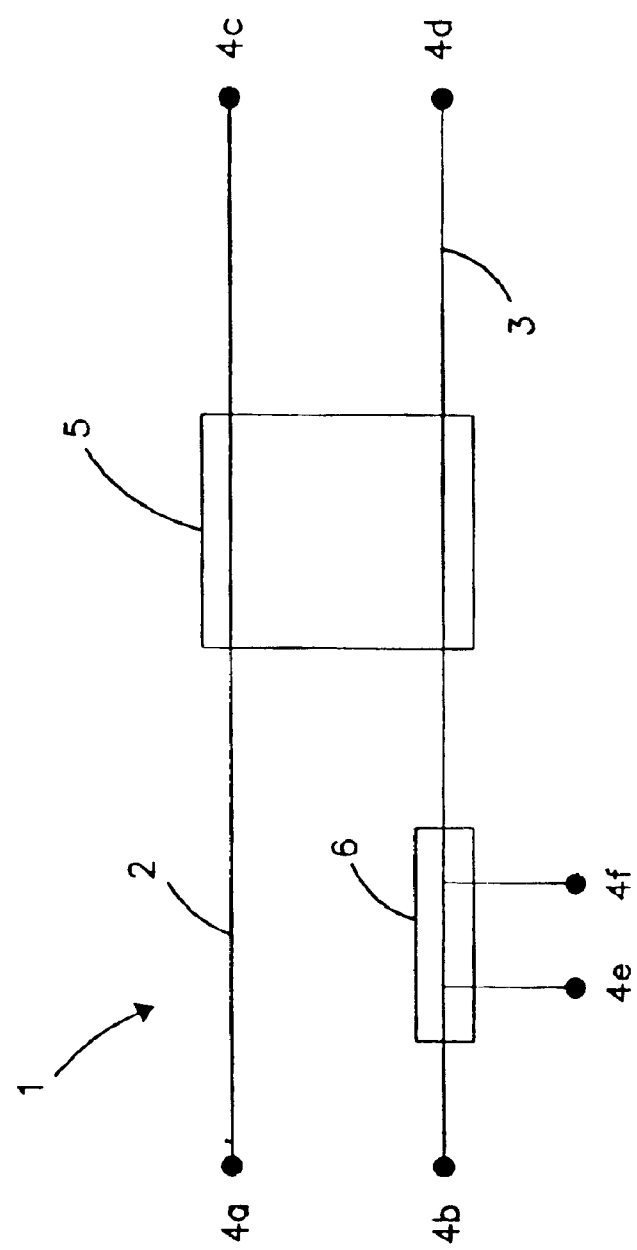
FIG. 1A is a schematic diagram of an optical circuit in accordance with the invention.

Referring now to FIG. 1A, a schematic representation of an optical circuit 1 in accordance with the present invention is shown including two optical signal pathways 2, 3 linking connection locations 4a and 4c, and 4b and 4d, respectively. Connection locations 4a–d may be any type of fiber optic connection system including fiber optic connectors/adapters, fiber optic splices, or other fiber optic connection system for transmitting fiber optic signals. A switch 5 between the two signal pathways 2, 3 allows normal passing through of the signals along each signal pathway in one state, and looping back of the signals in a second state. In the looping back state, connection location 4a can communicate with connection location 4b, and connection location 4c can communicate with connection location 4d. One example switch 5 is a 2×2 optical switch. Access to one or both of the signal pathways 2, 3 can be provided to the circuit by access arrangement 6, shown in the example as providing access to signal pathway 3. Preferably, access arrangement 6 provides an optical link between signal pathway 3 and connection locations 4e and 4f. Access to signal pathway 3 can be provided by a variety of devices including non-intrusive monitors and/or switches, such as 1×2 switches or 2×2 switches. Access to other portions of signal pathway 3, such as between switch 5 and connection location 4d can also be provided instead of or in addition to access arrangement 6. Similarly, access arrangements can be provided in signal pathway 2, in a similar manner. Circuit 1 has a variety of applications in fiber optic systems where access to one or more of the fiber optic pathways is desired.

Referring now to FIG. 1, a first preferred embodiment of a fiber optic module 10 using the circuit features of FIG. 1A is shown for cross-connecting fiber optic cables, and for providing test and access locations. Module 10 includes an optical circuit 11 including a transmit signal pathway 12 and a receive signal pathway 14 extending between fiber optic terminals or ports 16 and cross-connect terminals or ports 18. Specifically, fiber optic terminals (FOT) 16 include a transmit terminal T1 and a receive terminal R1. Cross-connect terminals 18 include transmit terminal T2 and receive terminal R2. Preferably, module 10 includes access terminals or ports for allowing access to signals passing through module 10. For example, test equipment and/or monitors can be optically linked to one of the transmit or receive signal pathways 12, 14. In the embodiment of FIG. 1, test equipment 20, and monitor 22 is linked to transmit signal pathway 12.

While use of two modules cross-connected together is shown in FIGS. 1–27, it is to be appreciated that circuit 11 can be mounted in other module housings, racks or frames, and circuit 11 can be part of a larger circuit within the same module housing, rack or frame as desired.

One or more switches are provided to selectively connect and disconnect the various signal pathways within module 10. For example, a first switch 24 is positioned to selectively connect and disconnect transmit signal pathway 12 with receive signal pathway 14. Further, switch 24 disconnects the connection between terminals T1 and T2, and terminals R1 and R2, when transmit signal pathway 12 is linked to receive signal pathway 14. A 2×2 optical switch is one preferred structure for switch 24.

As shown in FIG. 1, a second 2×2 optical switch is provided between terminal T1 and first switch 24. Second switch 30 allows a normal through path along transmit signal pathway 12 between terminals T1 and T2. Switch 30 further provides a loopback pathway between pathways 26 and 28 so as to optically link receive terminal R3 with transmit terminal T3 of test equipment 20. When second switch 30 is placed in a second state, transmit signal pathway 12 is interrupted and terminal T1 becomes optically linked with terminal R3, and terminal T3 becomes optically linked with terminal T2.

In module 10 of FIG. 1, a splitter 32 splits a portion of the signal from transmit signal pathway 12 and diverts it to a monitor pathway 34 optically linked to monitor terminal T1. Access to monitor pathway is by monitor terminal R4. One preferred splitter is a 90%–10% type splitter, although any percentage splitter is useable.

Module 10 can be utilized in five modes of operation if desired: normal, loopback, split/loopback, split, and monitor. In the normal mode of operation, first and second switches 24, 30 will be positioned so that the signals flow from terminals T1 to T2, and from terminals R2 to R1. The normal mode of operation also provides a loopback of the test equipment through second switch 30. Monitor mode is present at all times to monitor the signal in transmit signal pathway 12.

When the first switch 24 is in the loopback position, and the second switch 30 is in the normal position, module 10 is in the loopback mode. The signals flow from terminals T1 to R1, from terminals T2 to R2, and from terminals T3 to R3.

When the first switch 24 is in the loopback position and the second switch 30 is in the split position, module 10 is in the split/loopback mode. The signals flow from terminals T1 to R3, from terminals T2 to R2 and from terminals T3 to R1.

When the second switch 30 is in the split position and the first switch 24 is in the normal position, module 10 is in the split mode. The signals flow from terminals T1 to R3, from terminals T3 to T2, and from terminals R2 to R1.

Figure 2:
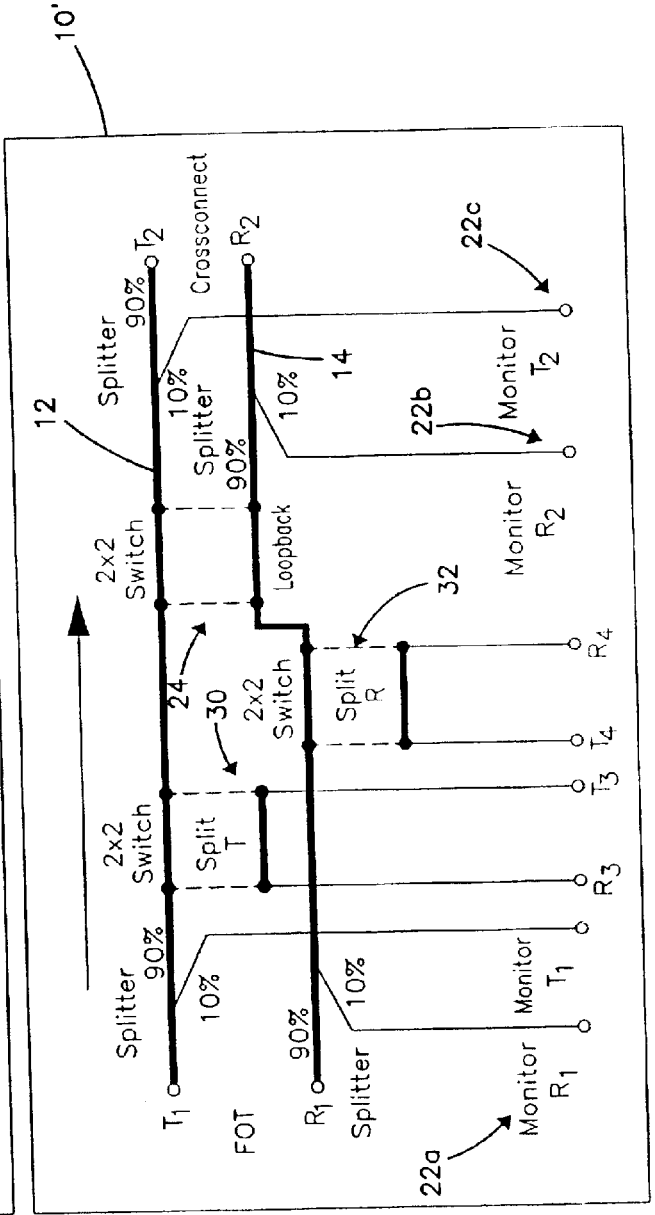
FIG. 2 is a schematic representation of various features which may be provided with various fiber optic access modules in accordance with the present invention.
Figure 3:
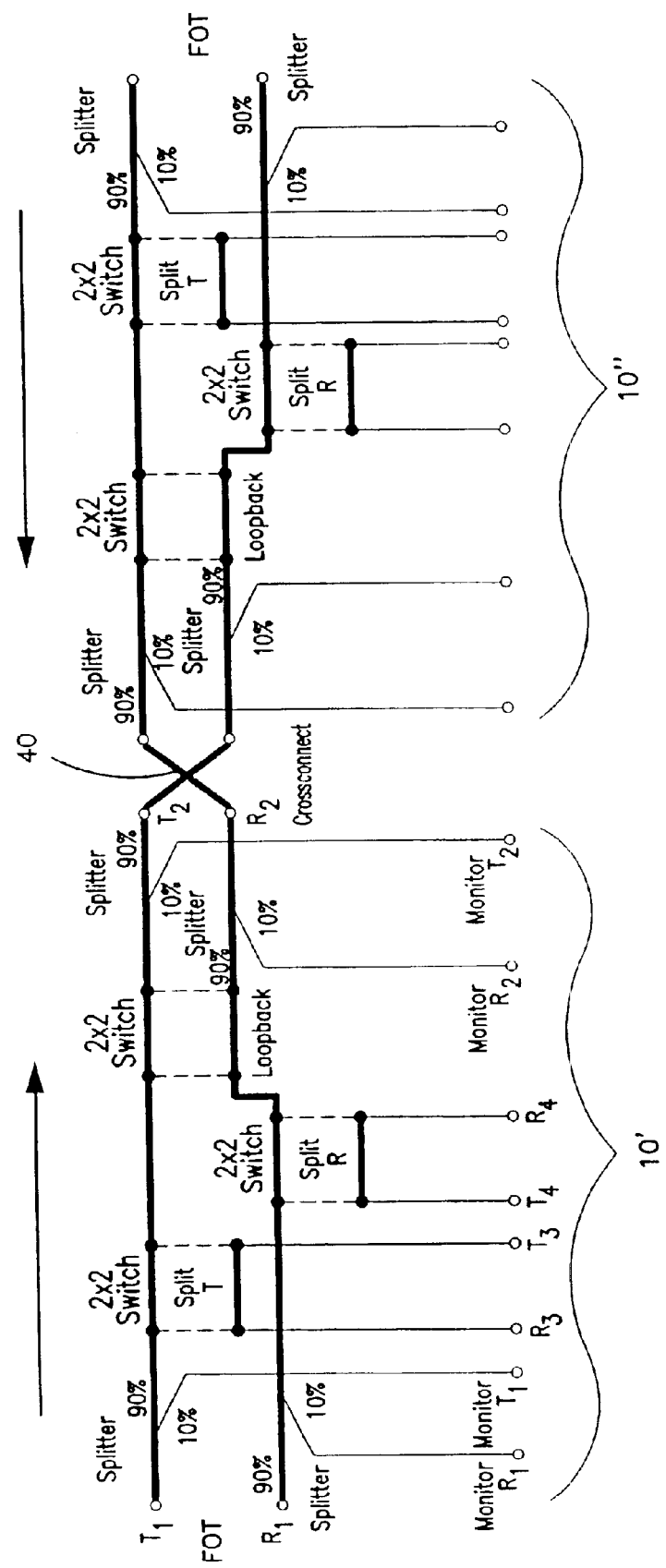
FIG. 3 is a schematic representation of two fiber optic access modules cross-connected together, and showing various features which may be provided with the various fiber optic modules of the present invention.

FIG. 2 illustrates schematically various features for module 10'. Module 10 of FIG. 1 is one embodiment of module 10'. Module 10' includes a 2×2 switch 32 in receive signal pathway 14. Typically, although not required, such a switch would be provided instead of second switch 30. Also, other monitors 22a, 22b, 22c may be provided at various points in the transmit and receive signal pathways 12, 14, if desired. Generally, module 10' would not likely exist with all of the features shown. FIG. 2 is provided to illustrate the wide variety of functions that could be provided as desired to access and monitor the various signal pathways at various points in the module. FIG. 3 shows schematically the module 10' representation of FIG. 2 cross-connected at cross-connection location 40 to a second module 10".

Figure 4:
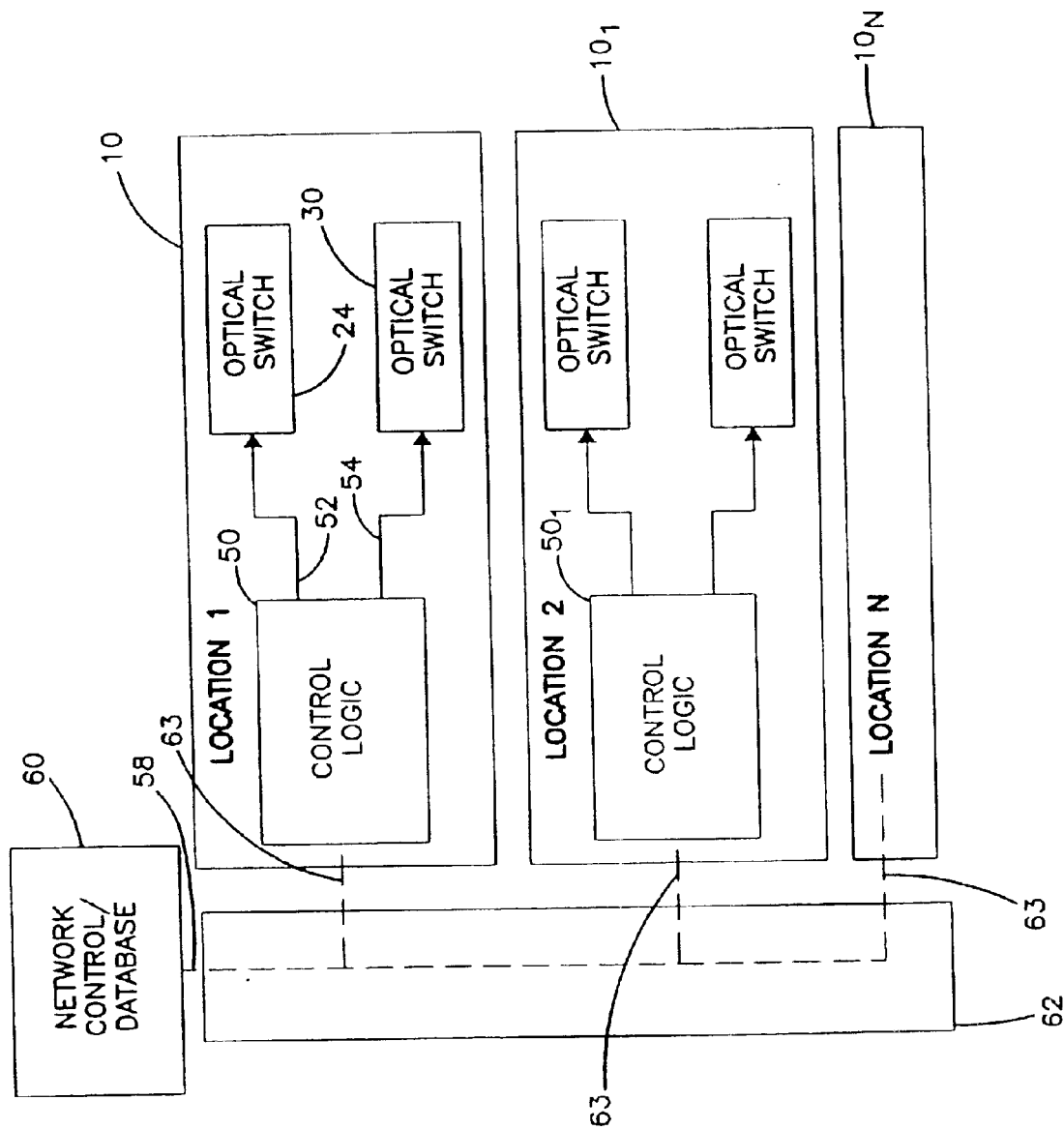
FIG. 4 is a schematic diagram of a control system for remotely controlling the optical switches in the fiber optic access modules.
Figure 5:
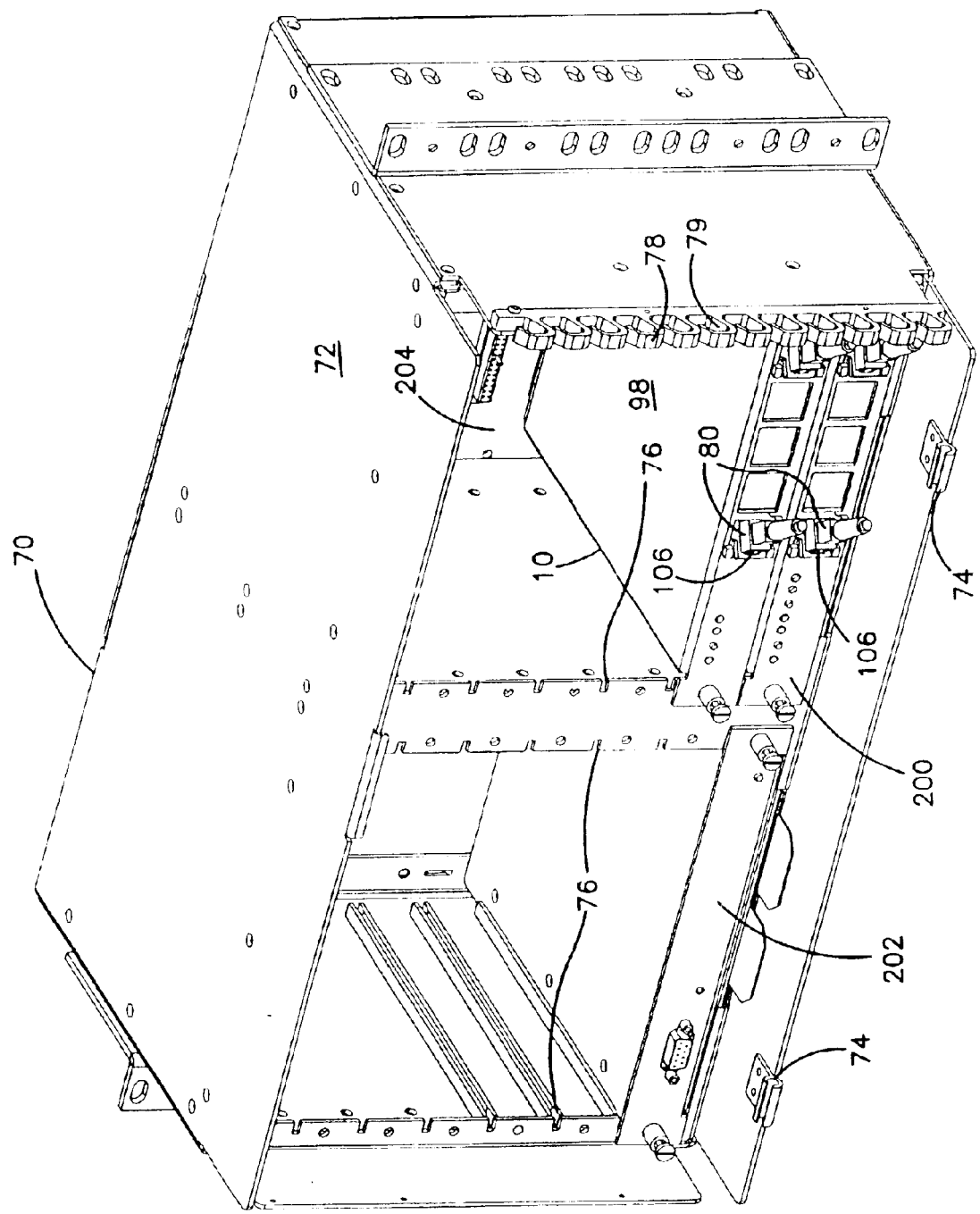
FIG. 5 is a perspective view of a chassis showing two fiber optic access modules mounted thereto.
Figure 6:
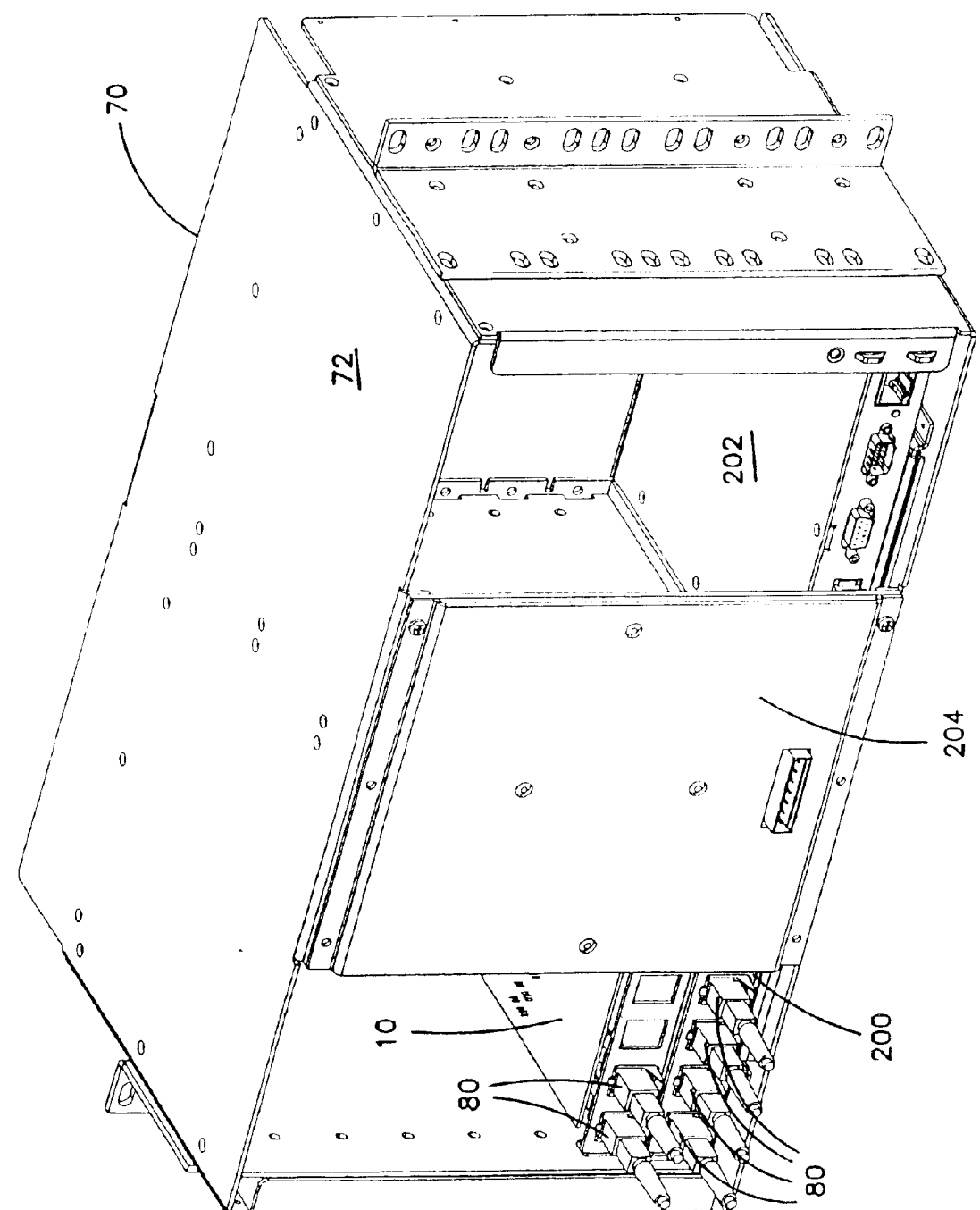
FIG. 6 is a rear perspective view of the chassis and modules shown in FIG. 5.
Figure 7:
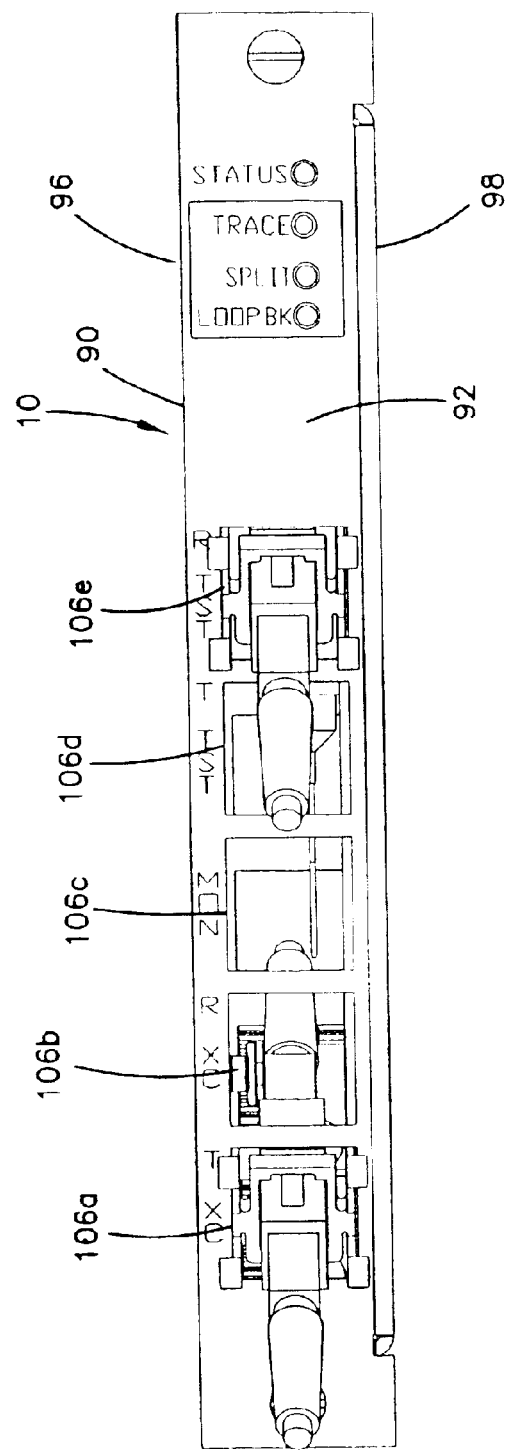
FIG. 7 is a front view of the single circuit fiber optic access module.
Figure 8:
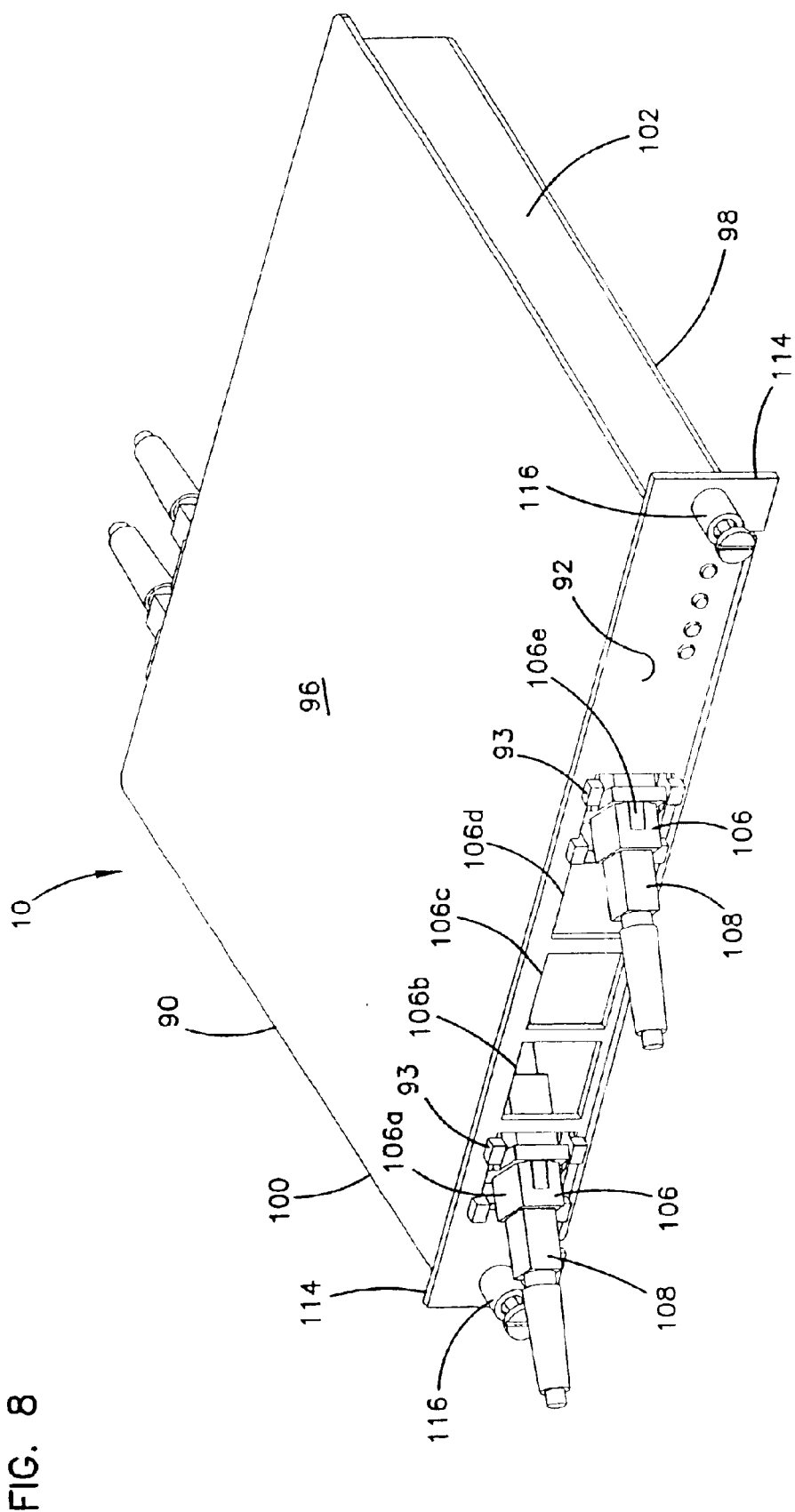
FIG. 8 is a front perspective view of the module of FIG. 7.
Figure 9:
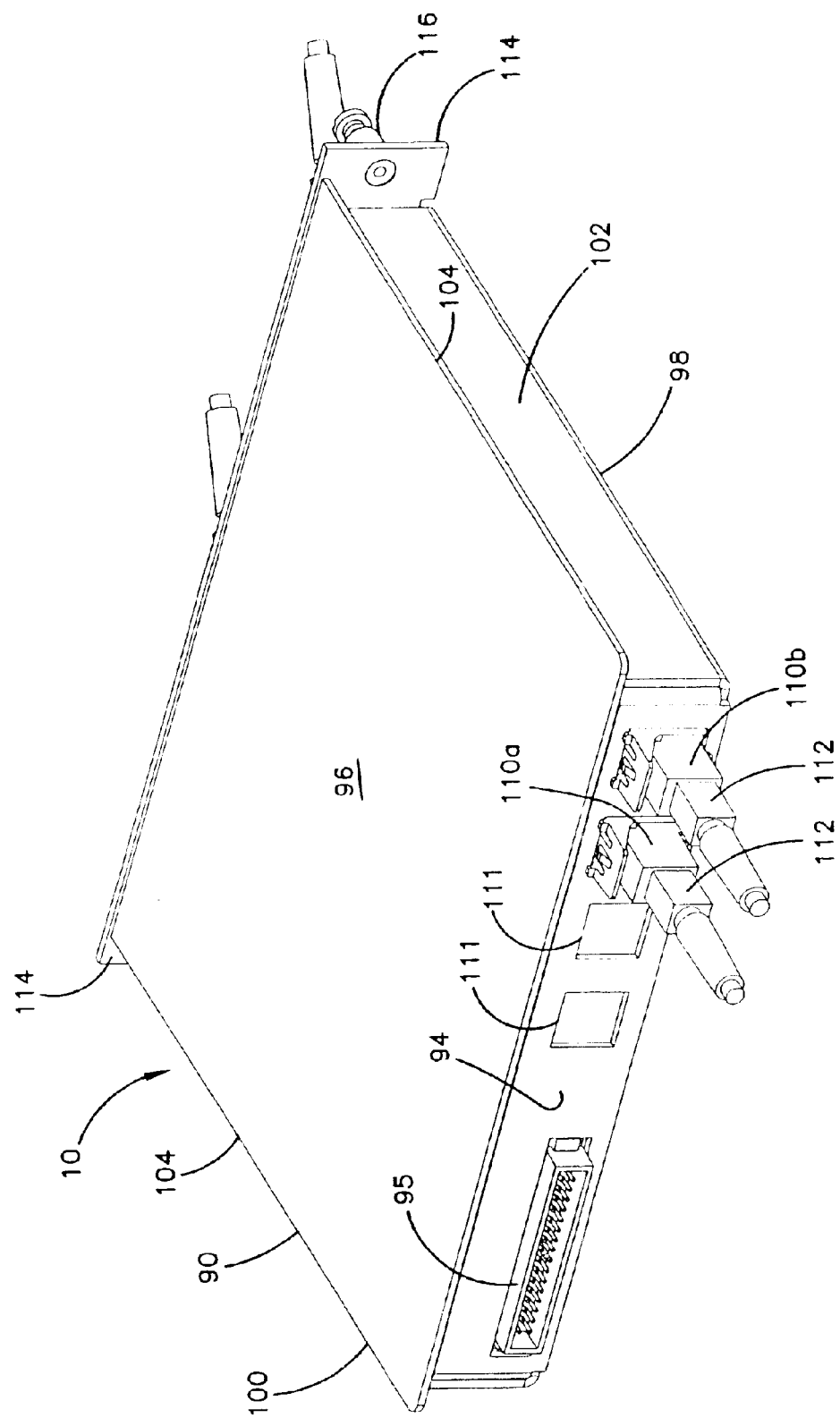
FIG. 9 is a rear perspective view of the module of FIG. 7.
Figure 10:
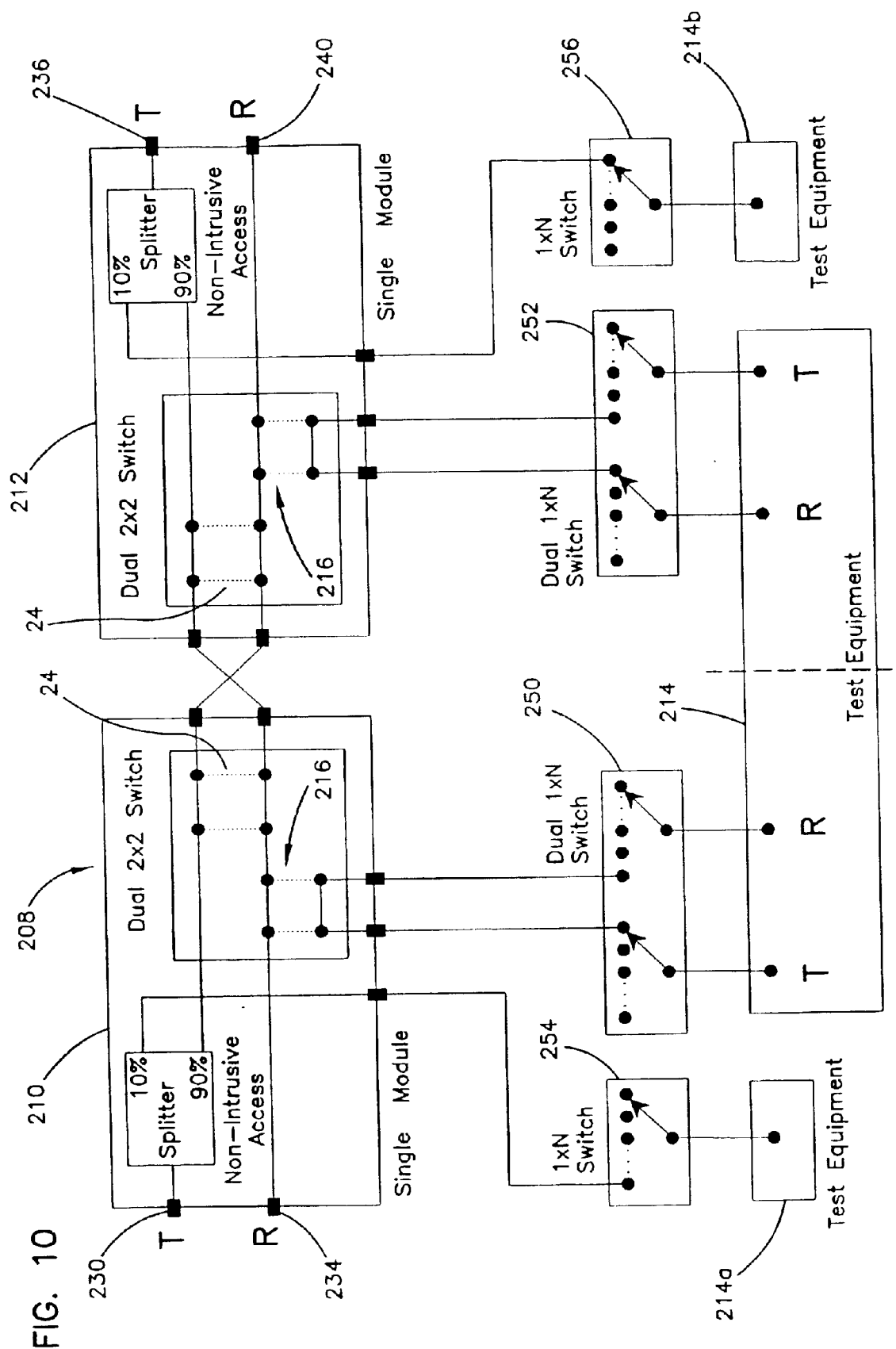
FIG. 10 shows two alternative fiber optic access modules cross-connected together, and connected to fiber optic test equipment.

Referring now to FIG. 4, the optical switches 24, 30 of module 10 can be operated remotely, if desired. Remote control is useful for remote accessing with test equipment. Alternatively, switches could be operated manually. In the case of remote control, control logic 50 is provided for each module $10_1$, $10_2$ ... $10n$. Links 52, 54 between control logic 50 operate each switch 24, 30. A network control/database 60 controls each control logic $50_1$, $50_2$ ... $50n$ by a link 58. Link 58 can be by ethernet, RS232, RS485, or other links. FIG. 4 also illustrates distributed control by controller 62 which may provide central local control of control logic 50 of each module 10 through links 63.

Referring now to FIGS. 5–9, a fiber optic chassis 70 is shown for holding a plurality of the fiber optic modules 10. Chassis 70 is mountable to a rack (not shown) for holding chassis 70. Chassis 70 includes an outer housing 72 and a pivotally mounted front door (not shown) hinged at hinge 74. Front door allows access to an interior of chassis 70, so as to access individual modules 10 such as for repair or replacement of modules 10 or to connect or disconnect the modules with other modules or fiber optic equipment. Chassis 70 includes a plurality of guides 76 for holding the individual modules 10 in a horizontal manner. Side opening 78 and cable clips 79 allows for cable pathways into and out of chassis 70.

Modules 10 have connection locations, terminals or ports 80 along the front and the rear. The modules 10 may be used for interconnecting the fiber optic equipment as desired, instead of through a traditional cross-connect connection.

Module 10 has a module housing 90 including a front face 92 and an opposite facing rear face 94. The front and rear faces 92, 94 each define connection locations 80 for connecting module 10 to fiber optic cables. In the embodiment shown, the front connection locations 80 are angled relative to front face 92, and the rear connection locations 80 extend transversely relative to rear face 94.

Module 10 further includes opposed major planar sides 96, 98. Module 10 further includes opposed minor planar sides 100, 102 defining sides of module 10 in the embodiment shown. Major side 96 has side extensions or flanges 104 which form slide rails for receipt in guides 76 of chassis 70. The module and chassis interface may be configured in accordance with commonly owned U.S. Pat. No. 5,363,465, which permits the modules to be flipped as they are moved from the left side to the right side and vice versa. Module 10 can be mounted vertically, if desired, instead of horizontally in a suitably configured chassis.

Module 10 includes a plurality of first adapters 106a–e (generally 106) exposed along front face 92 for the front connection locations 80 for connection to fiber optic connectors 108. In the FIGS. only adapters 106a and 106e are shown, but adapters 106b–d are similarly constructed. Adapters 106 are mounted to front face 92 by angled retainers 93, such as the type described and shown in U.S.

Pat. No. 5,214,735. A plurality of second adapters 110*a,b* (generally 110) are positioned along rear face 94 for the rear connection locations 80, also for connection to fiber optic connectors 112. The first and second adapters 106, 110 are preferably positioned in linear arrays parallel to front and rear faces 92, 94. The adapters shown are SC type, but could also be FC, ST, or any other suitable connection scheme. Two of the first adapters 106 (106*a,b*) are used to cross-connect fiber optic equipment connected to the second adapters 110*a,b* of module 10. Alternatively, module 10 can be interconnected to other equipment via front adapters 106. In the illustrated embodiment, adapter 106*c* defines a monitor port, and adapters 106*d,e* are used as access locations such as for connection to test equipment.

Module 10 includes two openings 111 which are not used in module 10. Now with reference to FIGS. 5 and 6, an additional module 200 is shown. Module 200 is a double density module where two pieces of equipment can be connected to module 200, for cross-connection through module 200 at front adapters 106. Front adapters 106 are dual density adapters.

Module 10 further includes end flanges 114 for use in mounting module 10 to chassis 70. Locking members 116 releasably hold flanges 114 to chassis 70. Locking members 116 include spring loaded and retained screws. Other locking members, besides screws may be used as desired, such as the type shown and described in U.S. Pat. No. 5,363,465 which operate to lock or release by rotating 90°.

Modules 10, 200 are electrically powered and are connected to a controller module 202 through a controller bus 204 of chassis 70. Plug 95 connects each module 10 to bus 204.

Referring now to FIGS. 10–20, two modules 210, 212 are shown cross-connected to one another in a system 208. Modules 210, 212 may be in the same chassis, or different chassis. Also modules 210, 212 may be in different locations altogether.

Modules 210, 212 are each also connected to test equipment 214. Test equipment 214 is shown as different test circuits which may not be part of the same test unit. Optical 1×N switches 250, 252 connect the test equipment 214 to modules 210, 212. Optical 1×N switches 254, 256 also connect monitor test equipment 214*a*, 214*b* to modules 210, 212. The various switches 250, 252, 254, 256 can be remotely operated. Modules 210, 212 differ from module 10 in that instead of a 2×2 switch 30 connecting the test equipment from the transmit signal pathway, a 2×2 switch 216 connects the receive signal pathway to the test equipment. FIGS. 11–20 illustrate various applications of the two modules 210, 212.

Figure 11:
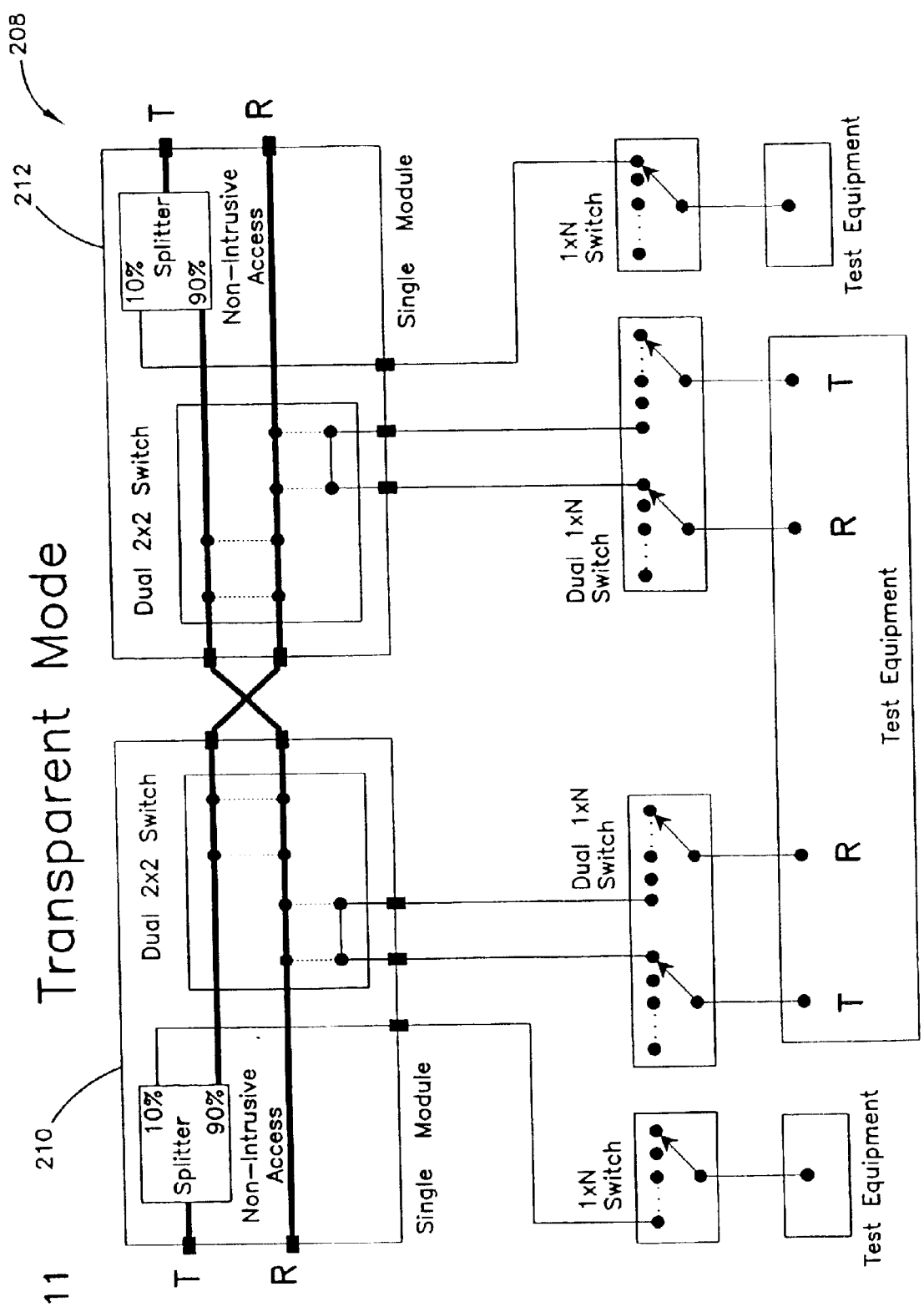
FIG. 11 shows the two modules of FIG. 10 in a transparent or normal mode.

FIG. 11 shows system 208 with modules 210, 212 operating in a normal or transparent mode in which the transmit signal of module 210 from transmit port 230 is received at receive port 240. Further a transmit signal from transmit port 236 is received at receive port 234 of module 210.

Figure 12:
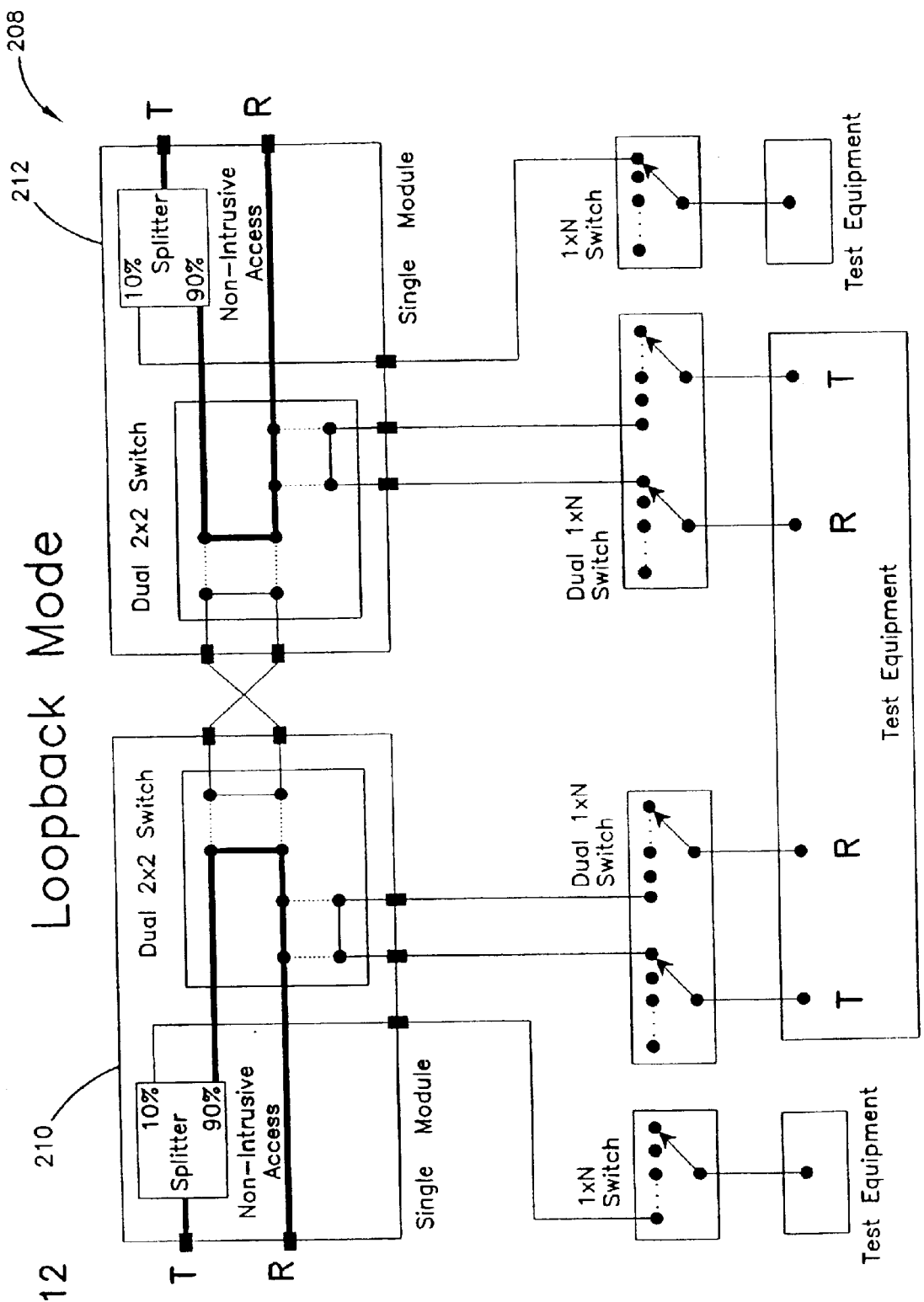
FIG. 12 shows the two modules of FIG. 10 in a loopback mode with respect to the fiber optic terminals.
Figure 13:
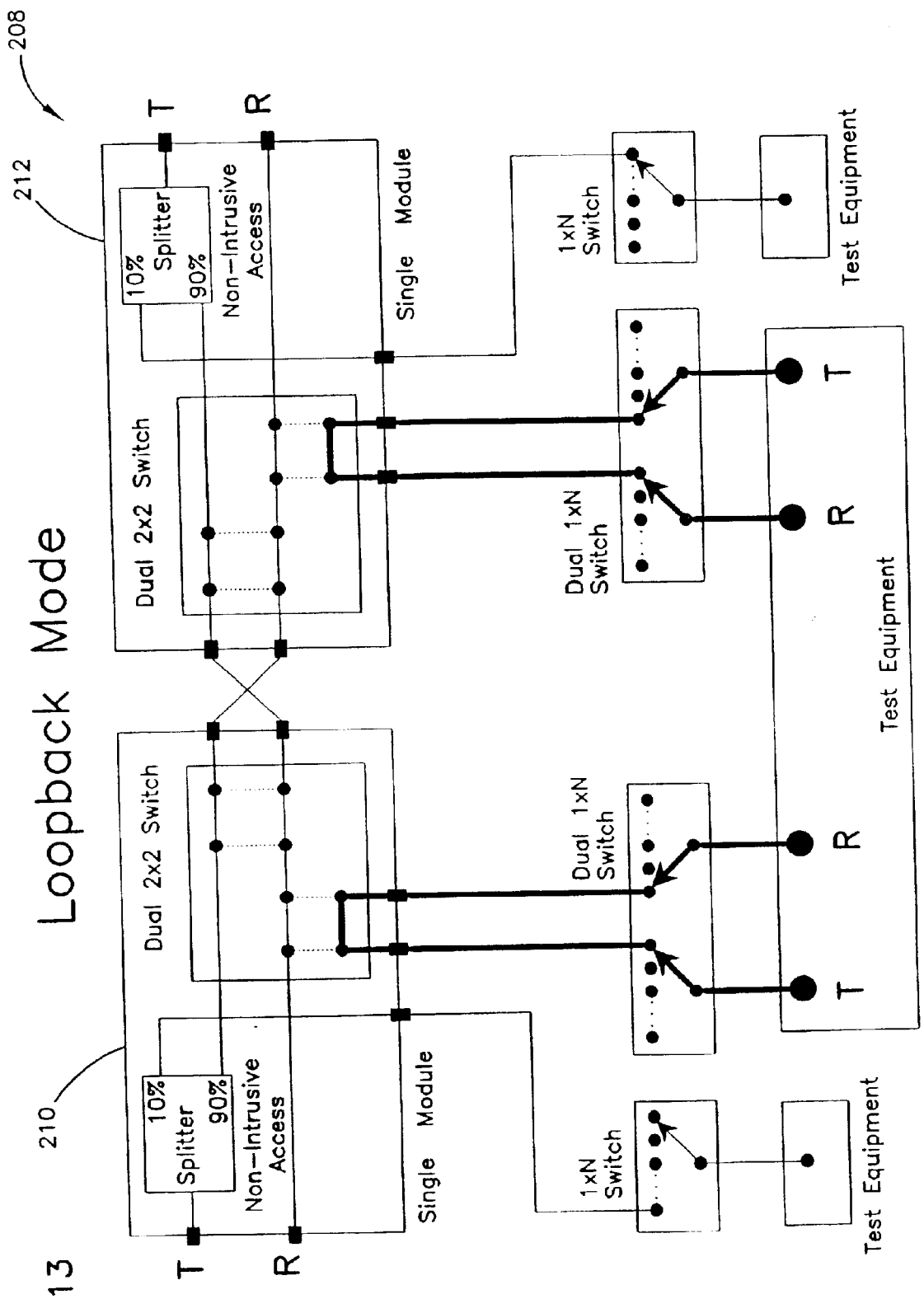
FIG. 13 shows the two modules of FIG. 10 in a loopback mode with respect to the test equipment.

FIG. 12 illustrates system 208 in a transmit and receive loopback mode once switches 24 are switched from the normal positions to the loopback positions. FIG. 13 illustrates use of system 200 in a loopback mode for the test equipment by maintaining second switches 116 in the normal position.

Figure 14:
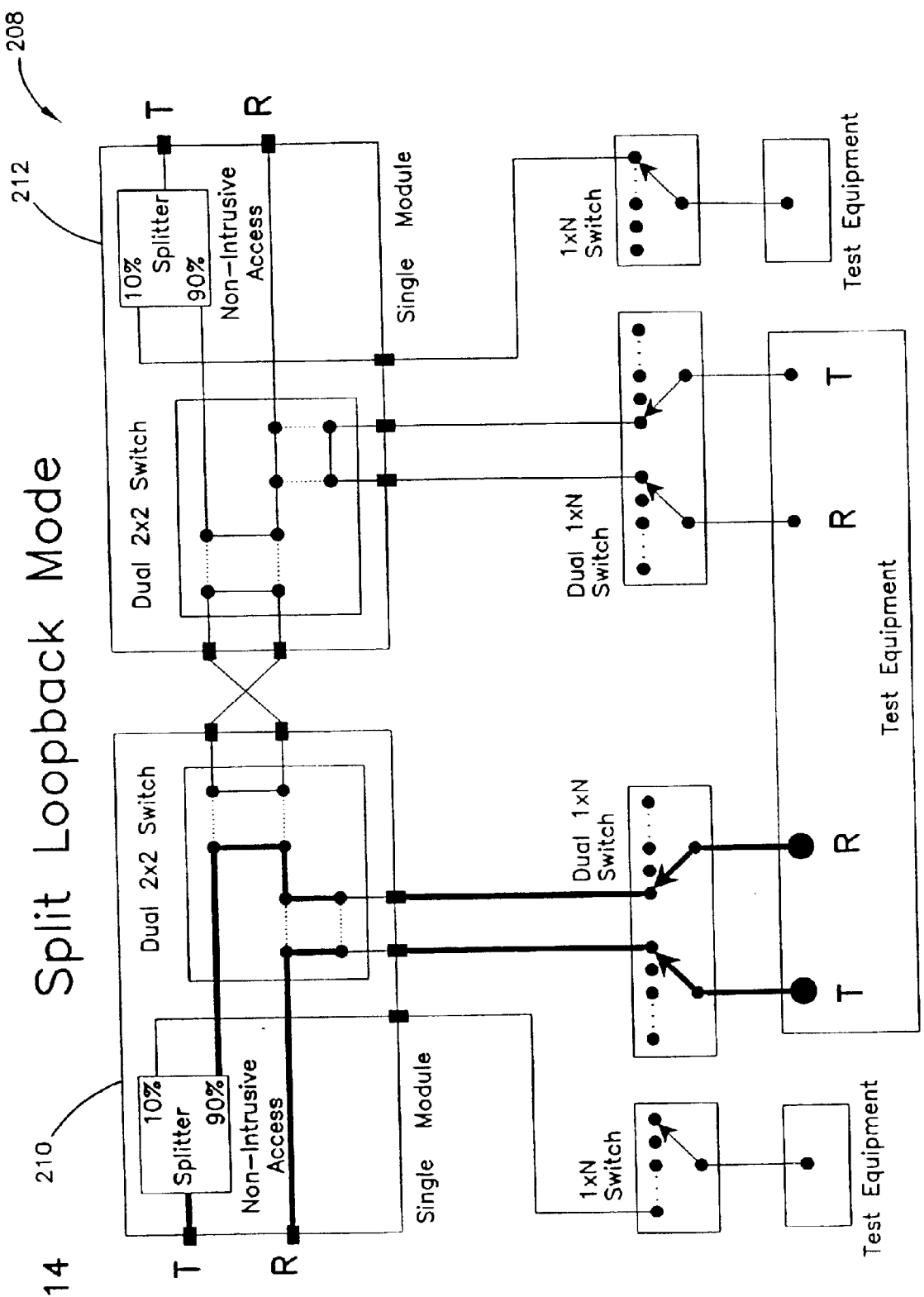
FIG. 14 shows the first module of FIG. 10 in a split loopback mode with respect to the test equipment.
Figure 15:
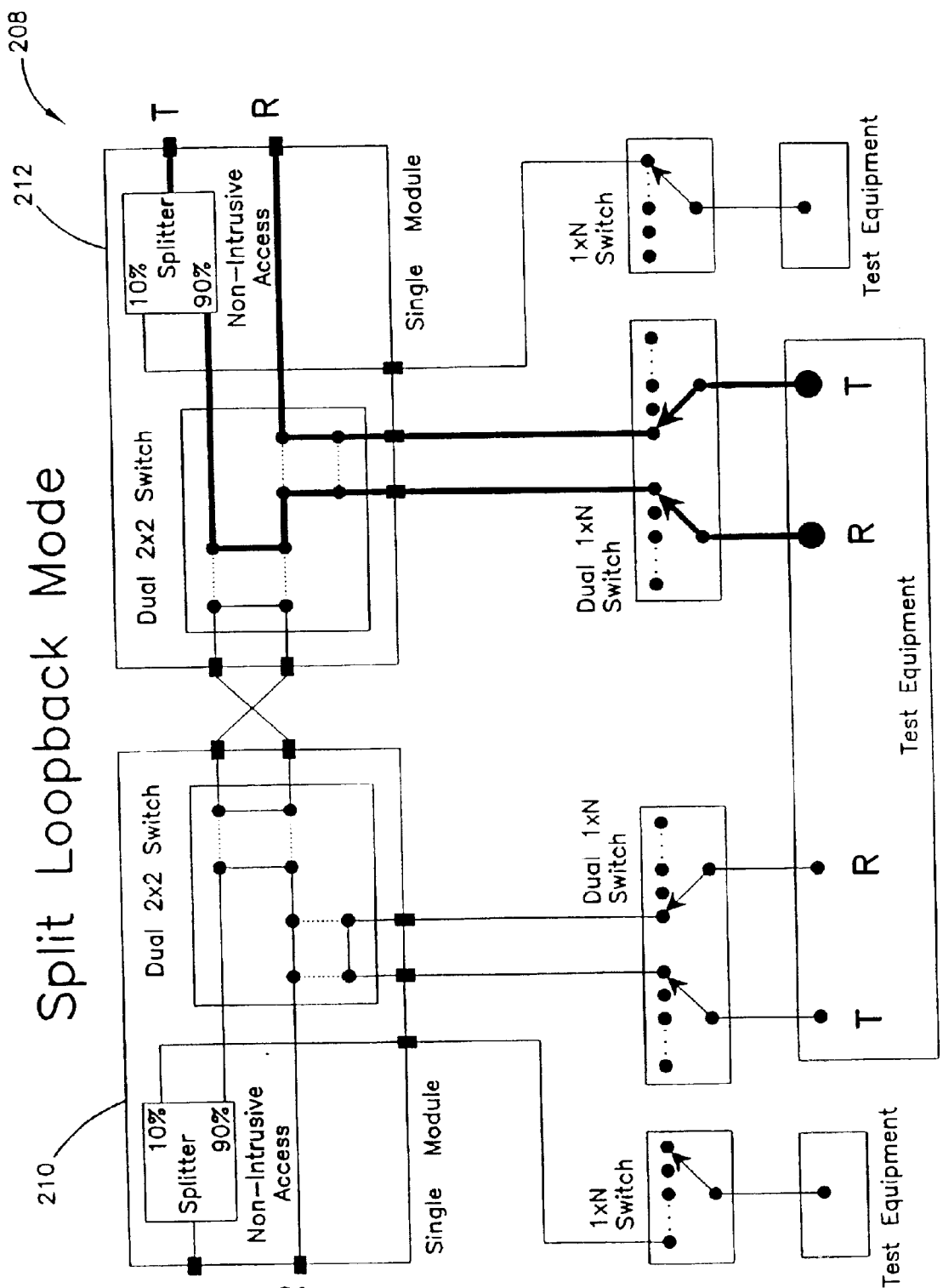
FIG. 15 shows the second module of FIG. 10 in a split loopback mode with respect to the test equipment.
Figure 16:
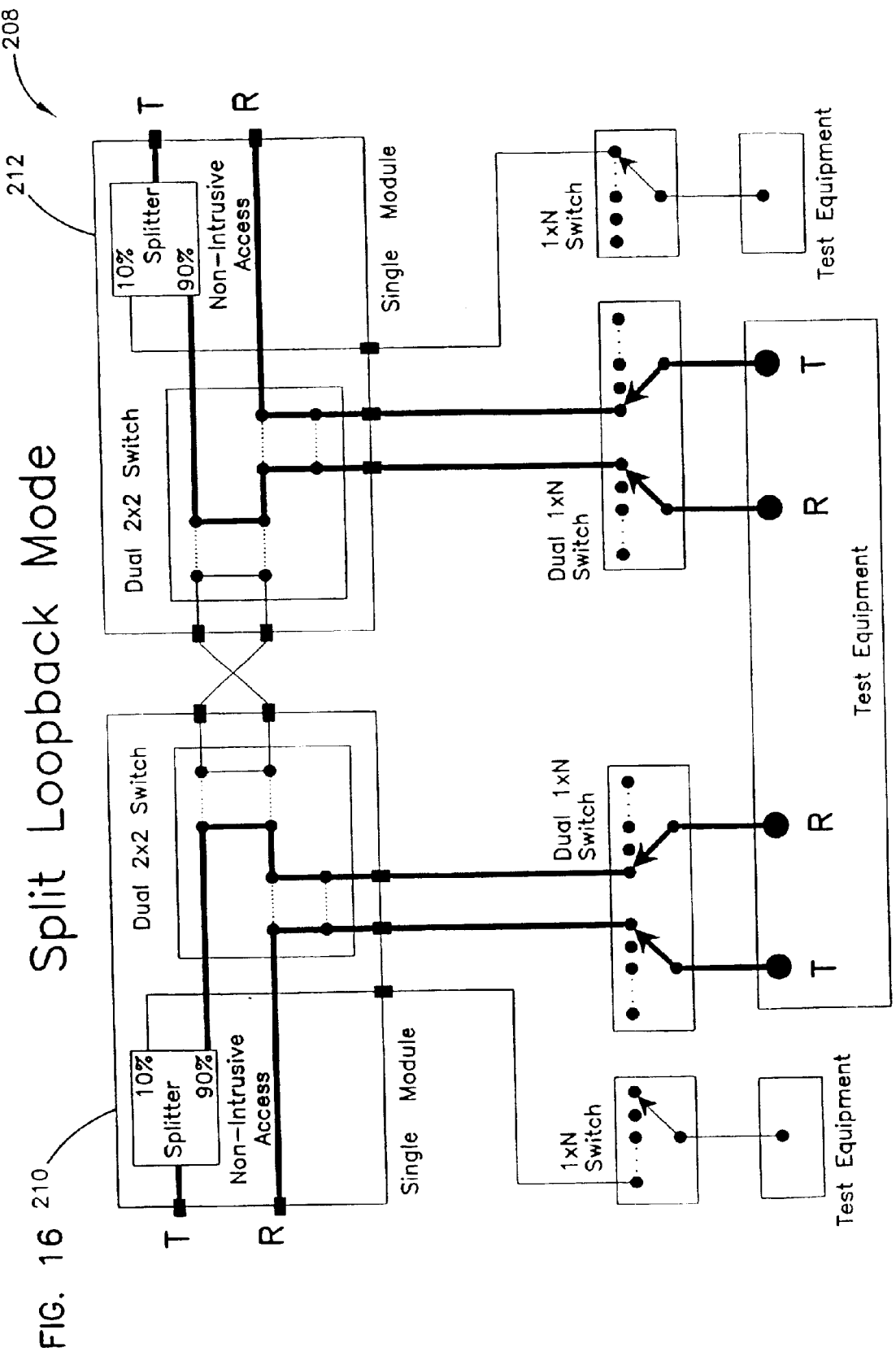
FIG. 16 shows both modules of FIG. 10 in the split loopback mode, as shown in FIGS. 14 and 15.

FIG. 14 illustrates system 208 in a split and loopback mode in which switch 24 is positioned in the loopback position, and switch 216 of module 210 is positioned in the split position. FIG. 15 shows a similar arrangement with respect to second module 212. FIG. 16 shows both modules being operated in the split and loopback mode.

Figure 17:
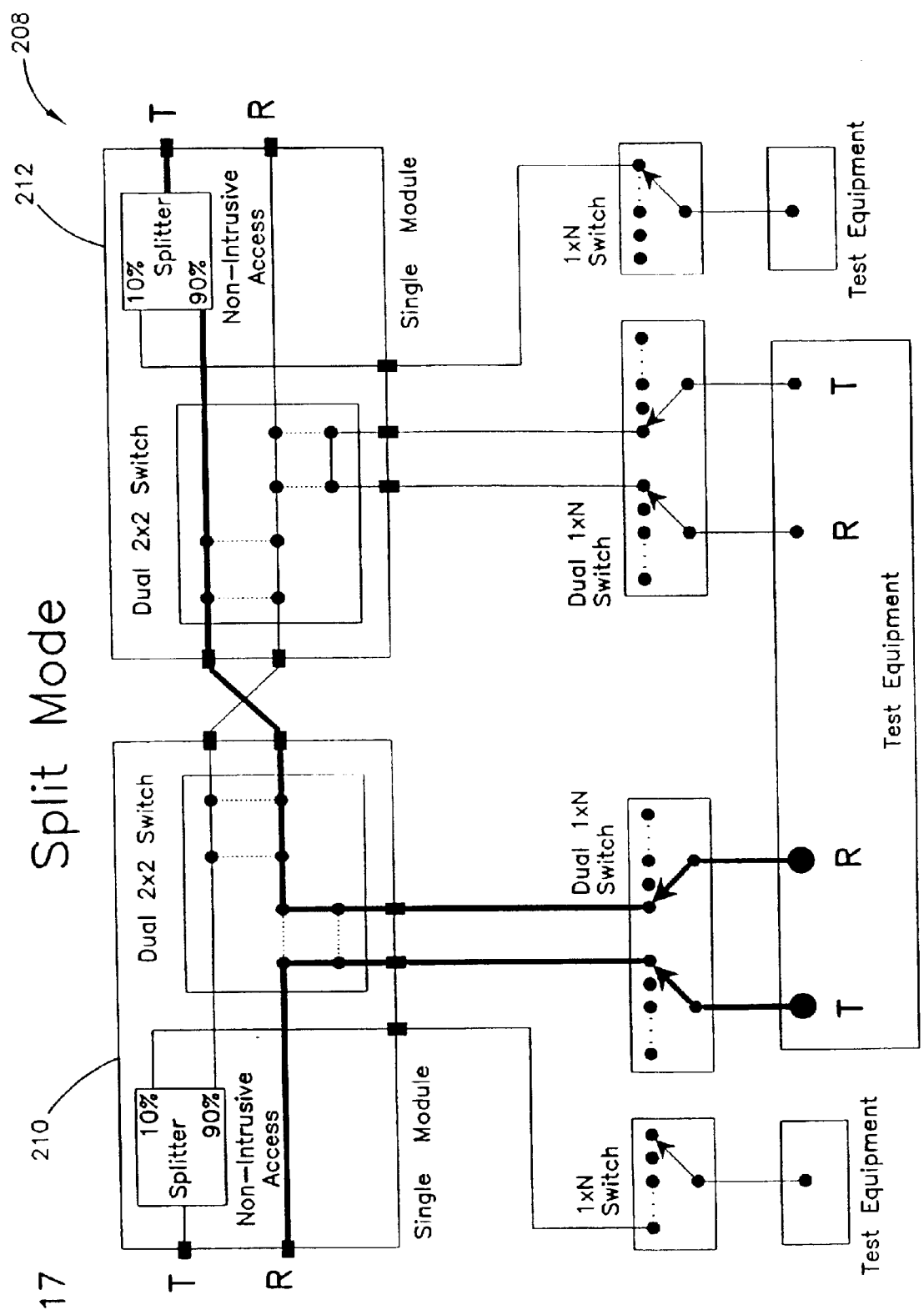
FIG. 17 shows the first module of FIG. 10 in a split mode where the transmit signal of the second module is received by the test equipment connected to the first module.
Figure 18:
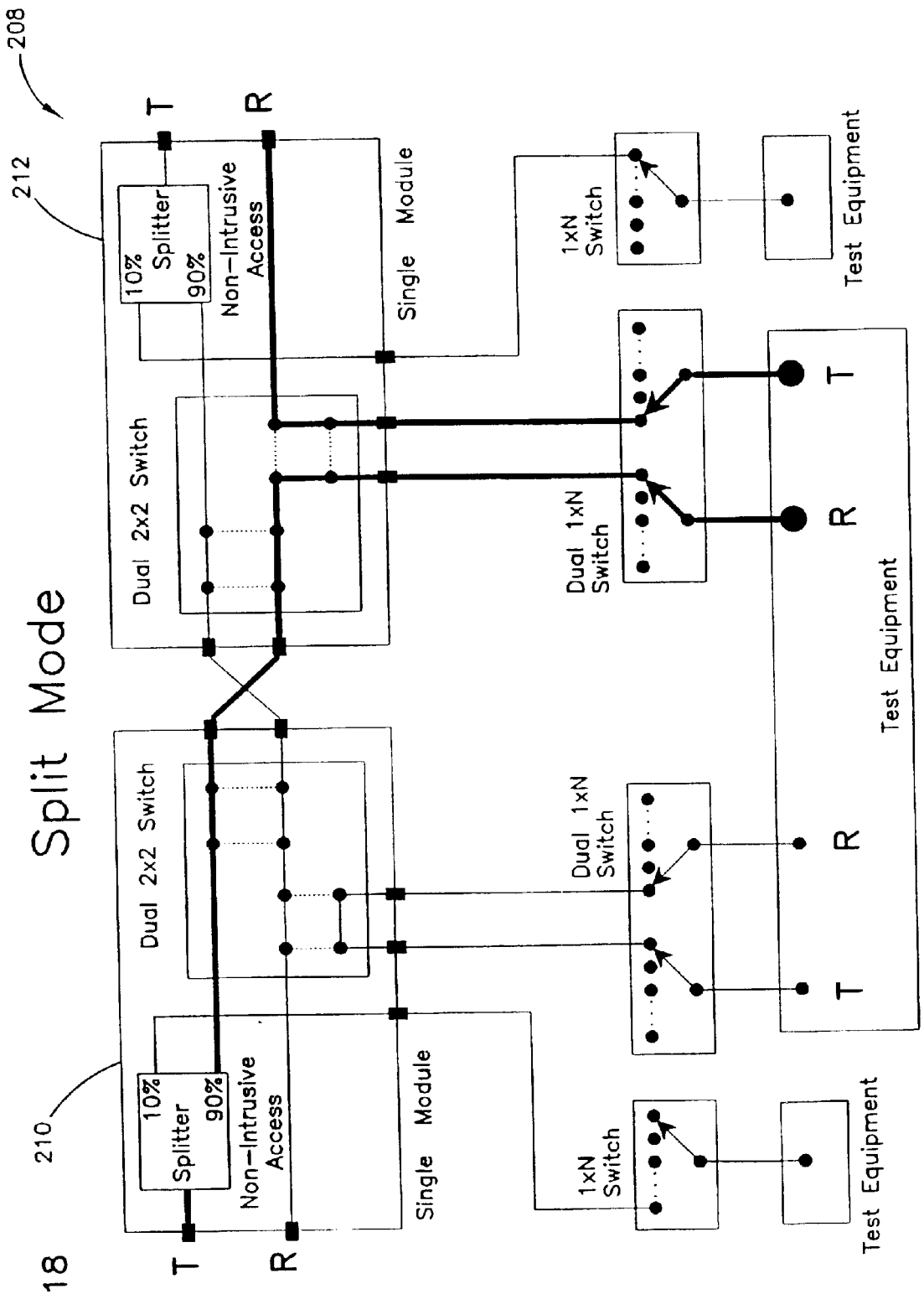
FIG. 18 shows the second module of FIG. 10 in a split mode where the transmit signal of the first module is received by the test equipment connected to the second module.
Figure 19:
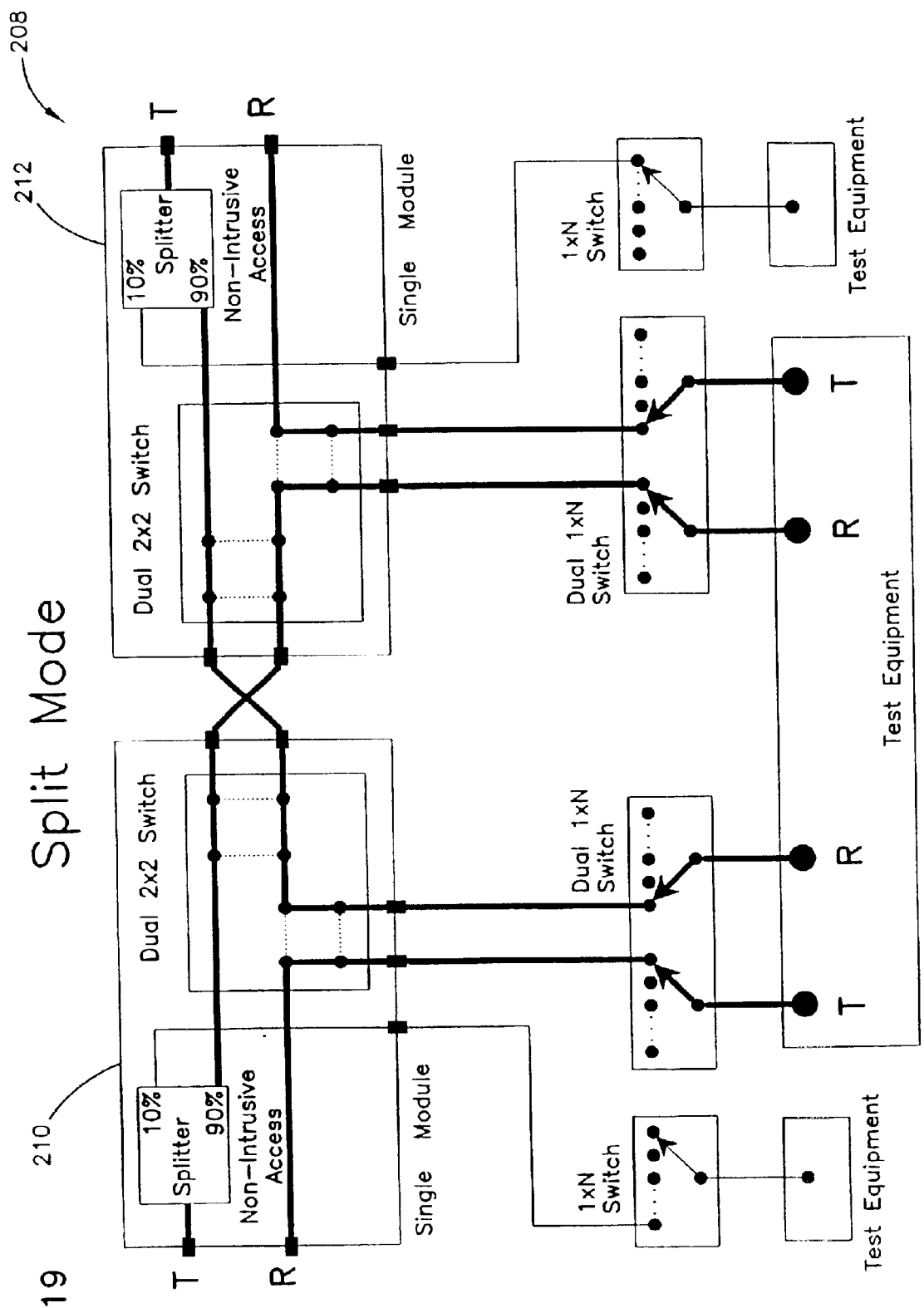
FIG. 19 shows both modules of FIG. 10 in the split mode, as shown in FIGS. 17 and 18.

FIG. 17 shows system 208 being operated in a split mode where the transmit signal of module 212 is received by the test equipment of module 210. Further, the transmit signal from the test equipment is received by receive port 234 of module 210. FIG. 18 shows a transmit signal from transmit port 230 being received by the test equipment of module 212. The transmit signal of the test equipment of module 212 is received by receive port 240 of module 212. FIG. 19 shows both modules 210, 212 being operated in the split mode.

Figure 20:
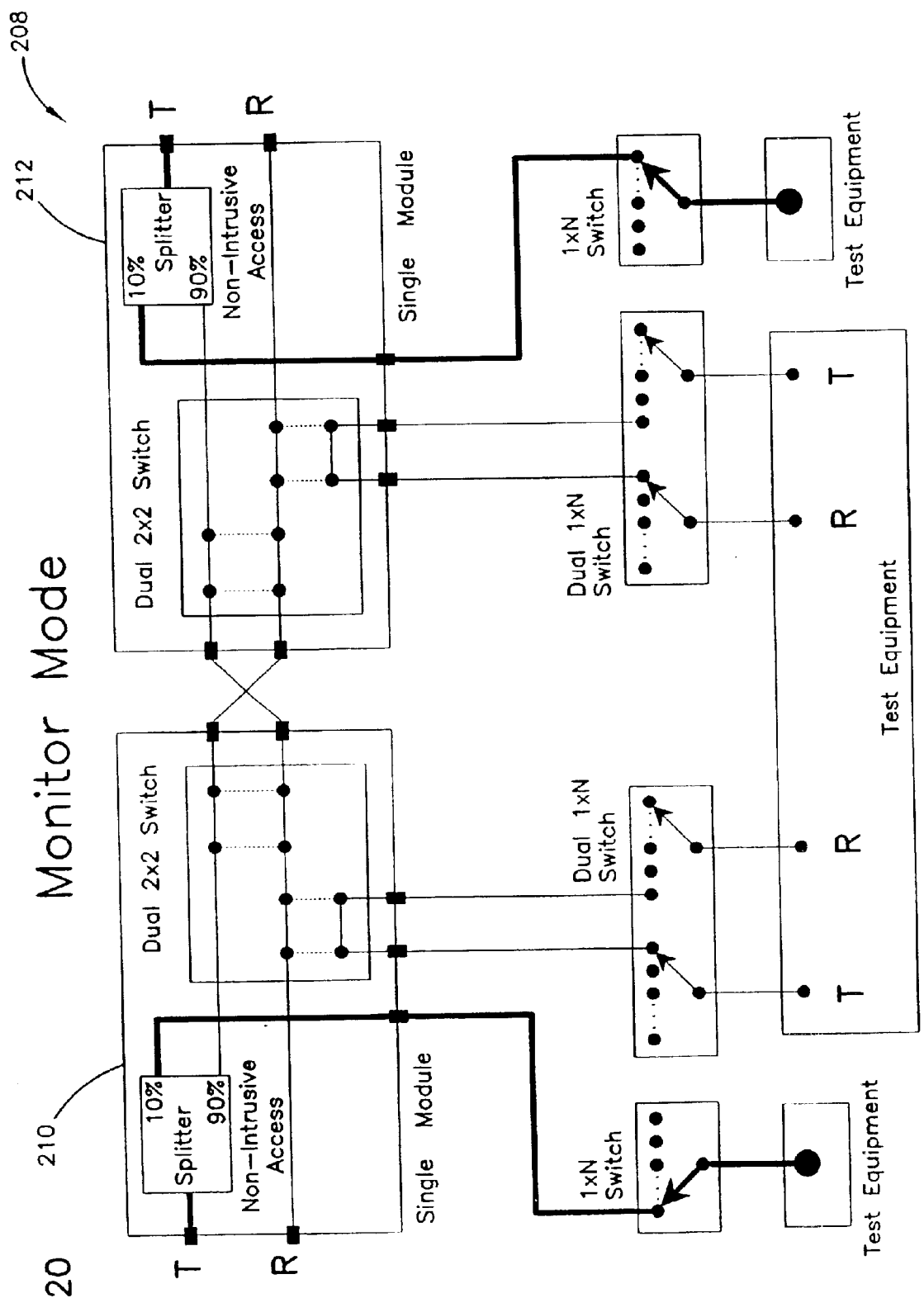
FIG. 20 shows both modules of FIG. 10 in a monitor mode with respect to the test equipment.
Figure 21:
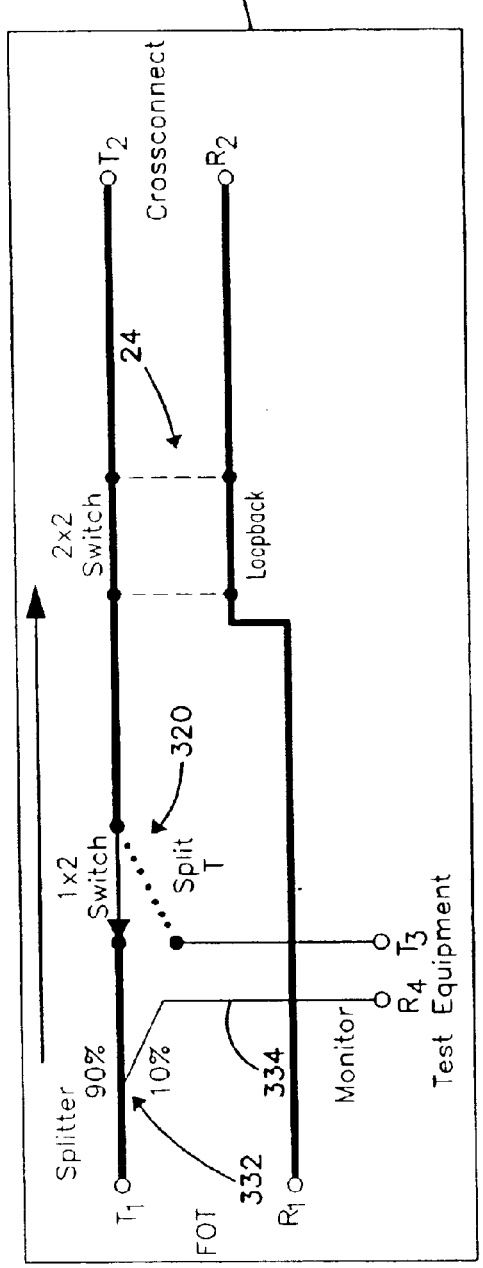
FIG. 21 is a schematic diagram of a second embodiment of a fiber optic access module including a 2×2 loopback switch, and a 1×2 split switch positioned in the transmit signal pathway.

FIG. 20 shows both modules 210, 212 being operated in the monitor mode so as to monitor the output from both transmit ports 230, 236 of the respective test equipment.

Referring now to FIGS. 21–24, an alternative embodiment of a module 310 is shown similar to module 10 including a first 2×2 switch 24, but further including a 1×2 switch 320 instead of second switch 30. Module 310 also includes a splitter 332 and a monitor pathway 334 to monitor test equipment. The 1×2 switch 320 allows for module 310 to be manufactured more inexpensively since a 2×2 switch is avoided. However, no loopback to the test equipment is possible as for module 10. Also, only a portion (in the example shown, 10%) of the signal can be tested from terminal T1.

While the preferred embodiments show the modules 210, 212 including the 2×2 switches 24, 30, it is to be appreciated that only one module in the circuit may be provided with the switching features.

Figure 22:
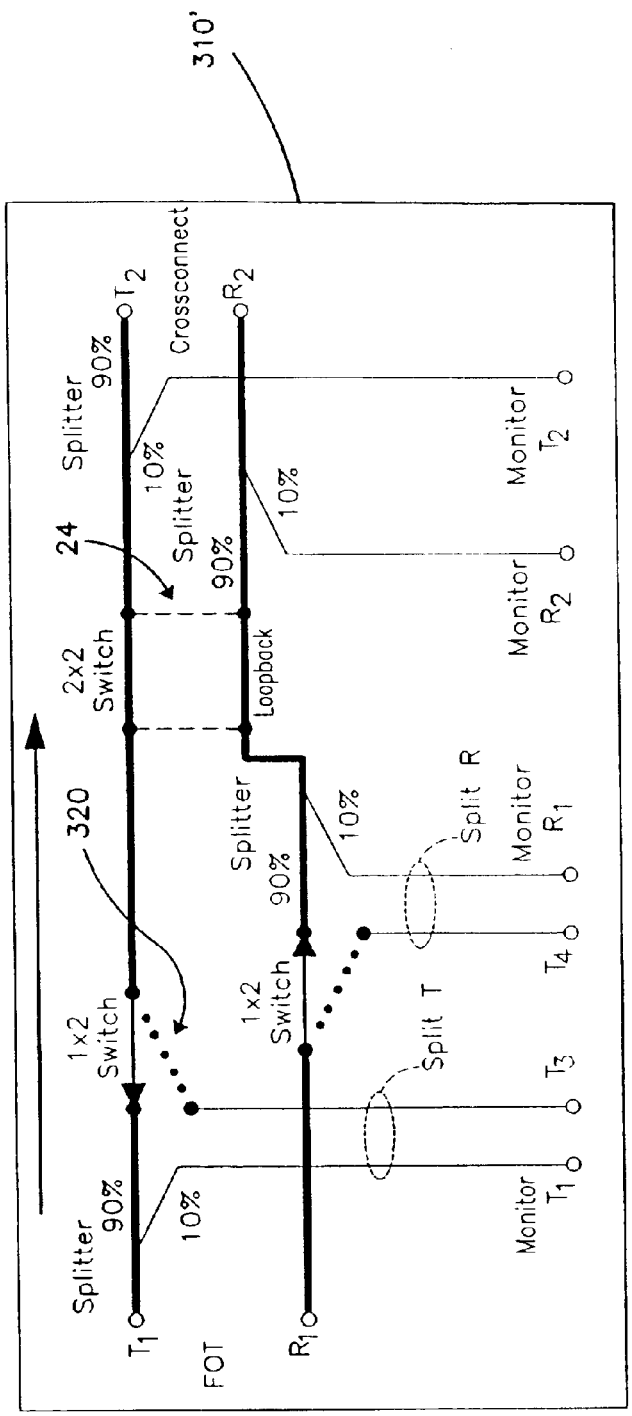
FIG. 22 is a schematic representation of various options for the module of FIG. 21.
Figure 23:
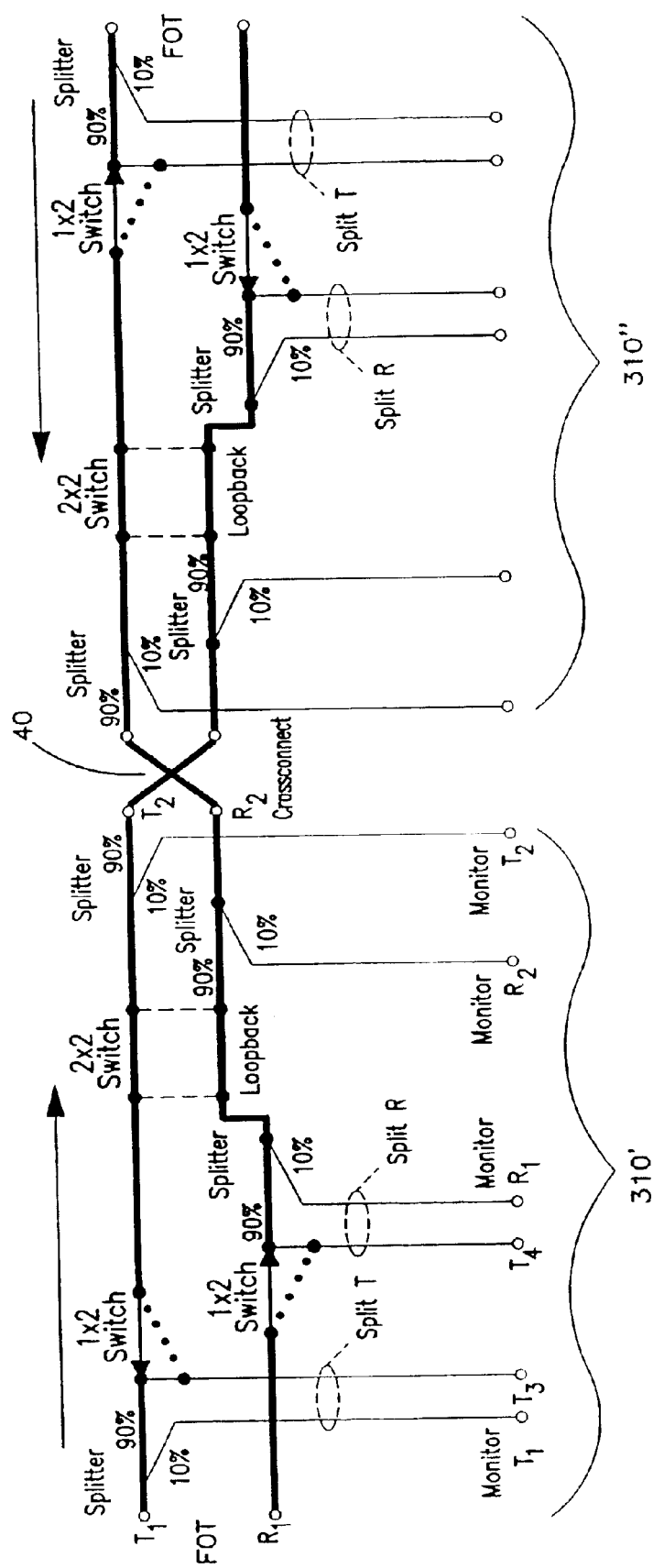
FIG. 23 is a schematic representation showing various options for two modules of the type shown in FIG. 22 cross-connected together.

FIG. 22 shows various features which may be utilized in the various possible configurations for module 310' including positioning of the 1×2 switch in the receive signal pathway. Also, various monitors are shown for monitoring other portions of the signal pathways. FIG. 23 shows schematically two modules cross-connected 310', 310", and including all of the various options available for the two modules.

Figure 24:
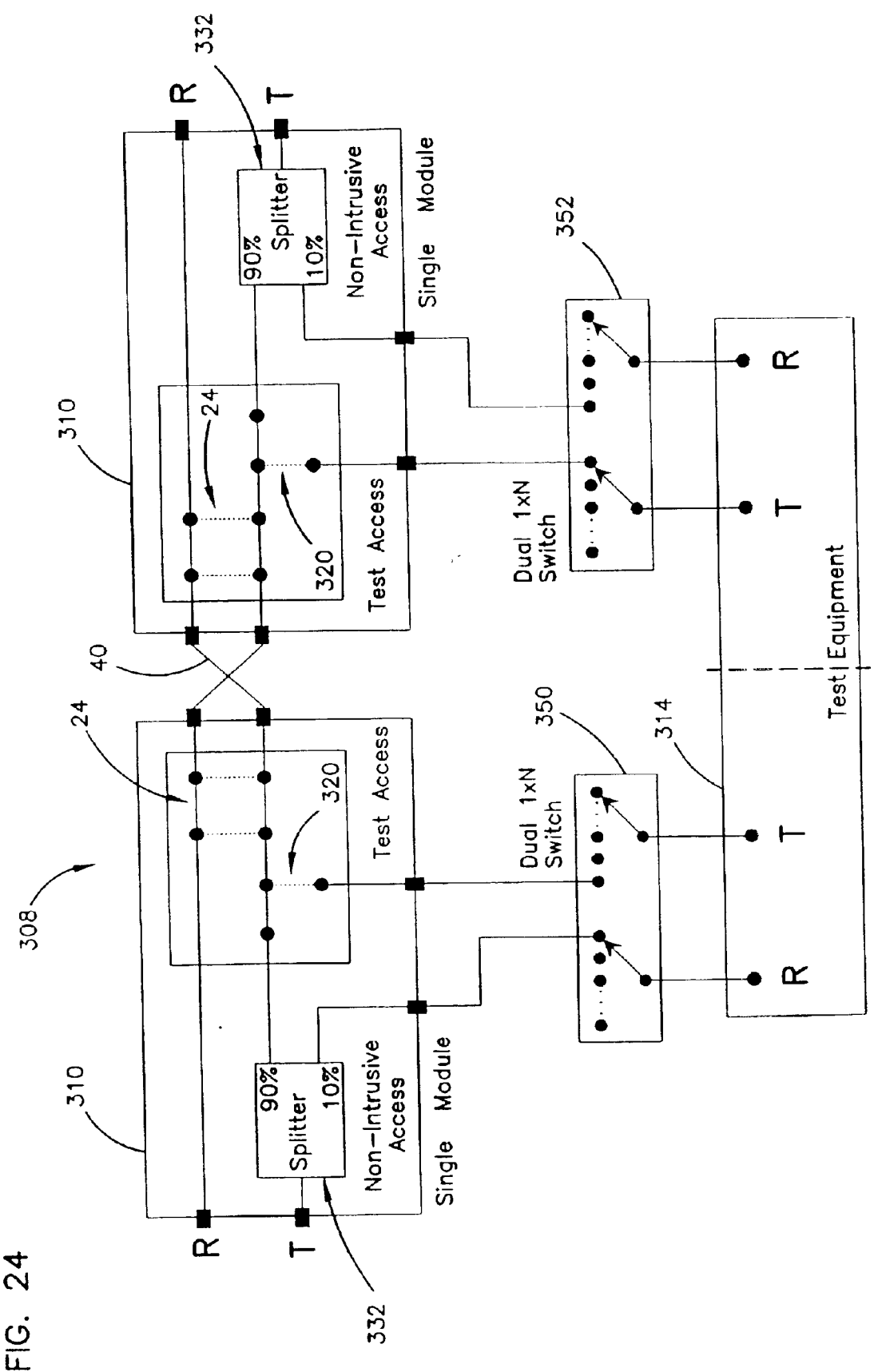
FIG. 24 shows two fiber optic access modules cross-connected together of the type shown in FIG. 21, and also shown connected to fiber optic test equipment.

Referring now to FIG. 24, two modules 310 are shown cross-connected to one another in a system 308. Modules 310 may be in the same chassis or different chassis. Also, modules 310 may be in different locations altogether.

Modules 310 are each also connected to test equipment 314. Test equipment 314 is shown as different test circuits which may not be part of the same test unit. As above in system 208, optical 1×N switches 350, 352 connect the test equipment 314 to modules 310. The switches 350, 352 can be remotely operated. System 308 can be operated under various applications depending on the positioning of switches 24, 320.

Figure 25:
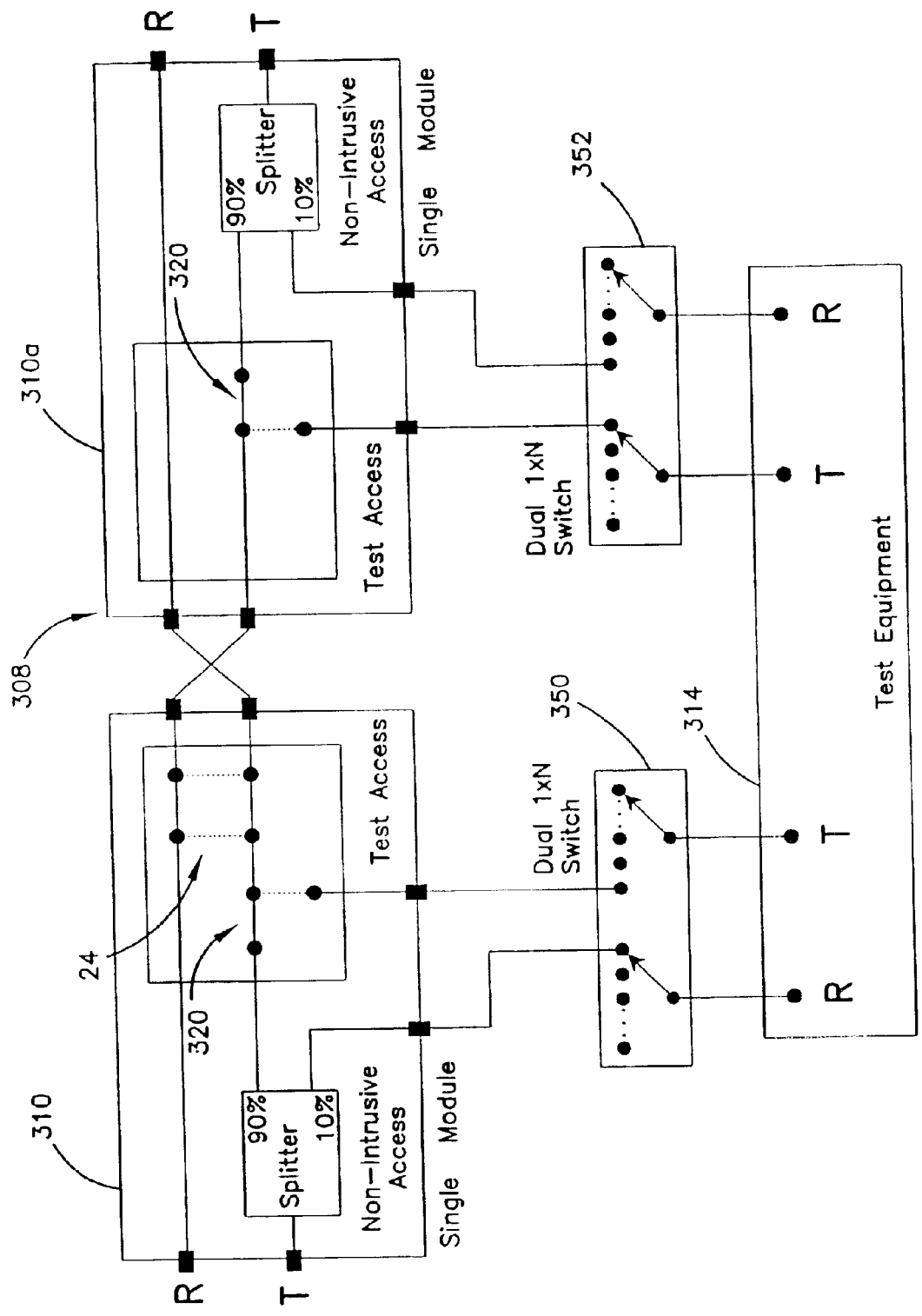
FIG. 25 shows a modification to one of the modules of FIG. 24, where a 2×2 switch has been eliminated.
Figure 26:
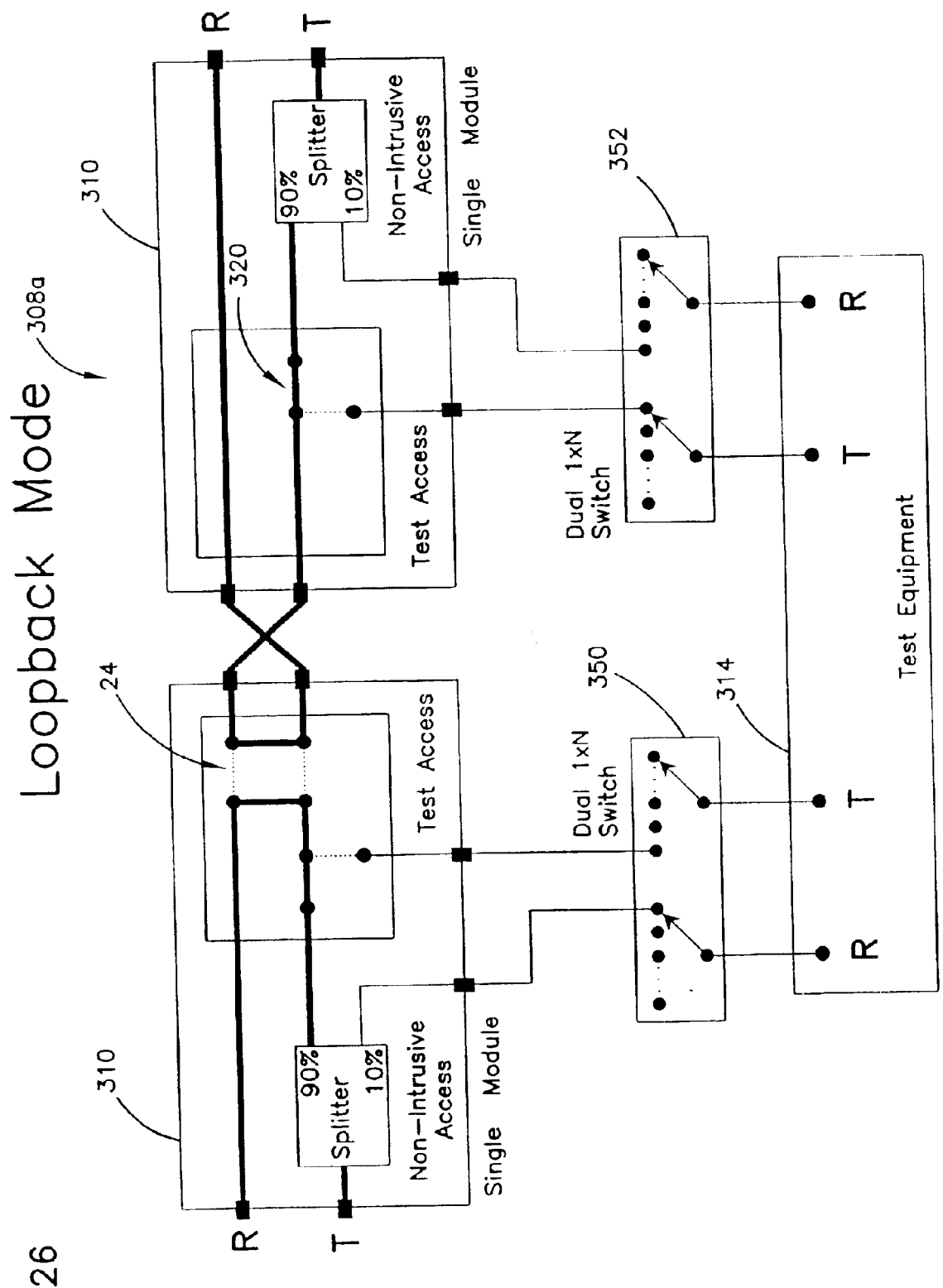
FIG. 26 shows the two modules of FIG. 25 showing the loopback pathways for the primary signals.
Figure 27:
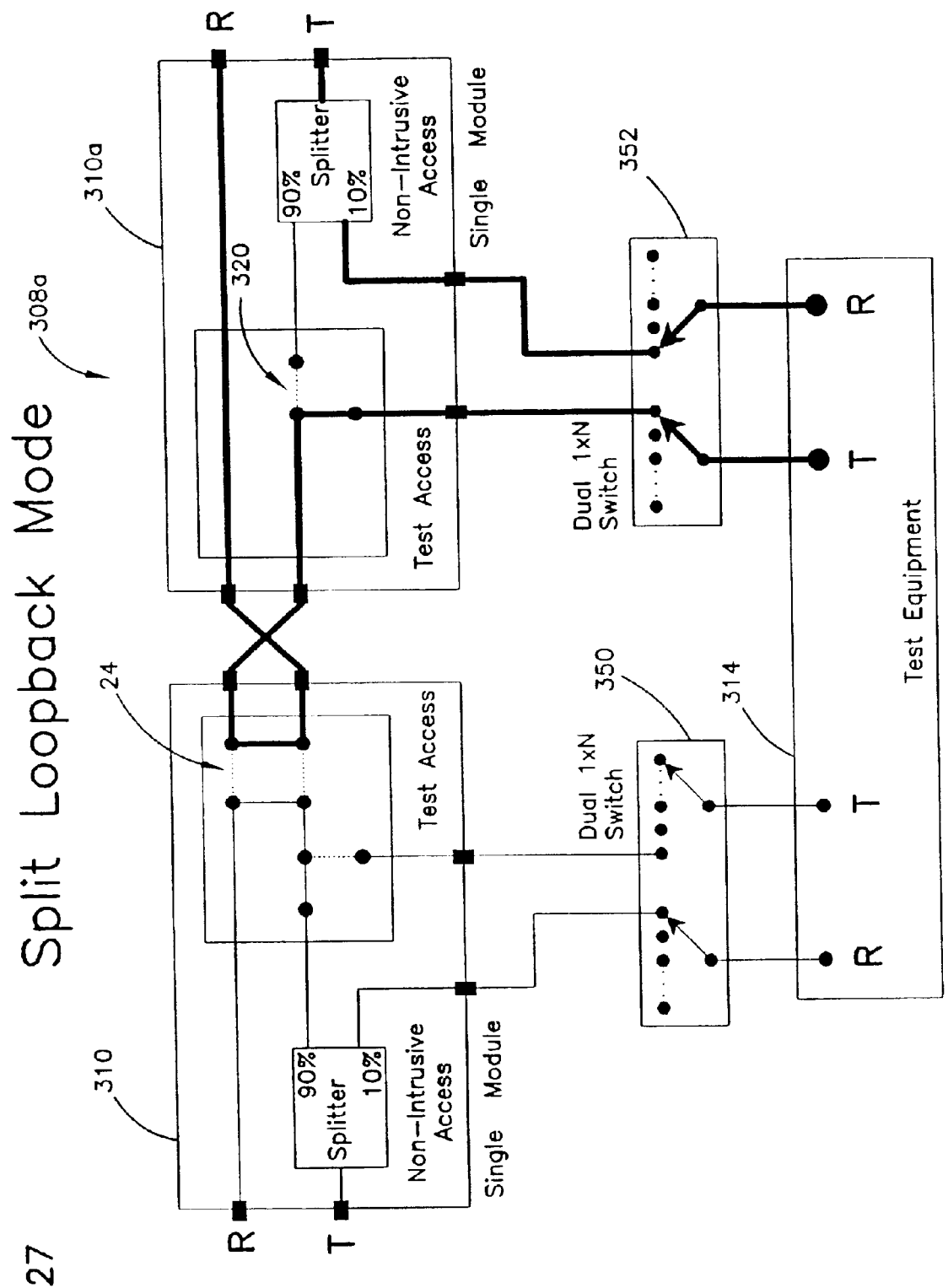
FIG. 27 shows the two modules of FIG. 24 showing the split and loopback pathway for the module lacking the 2×2 switch.
Figure 28:
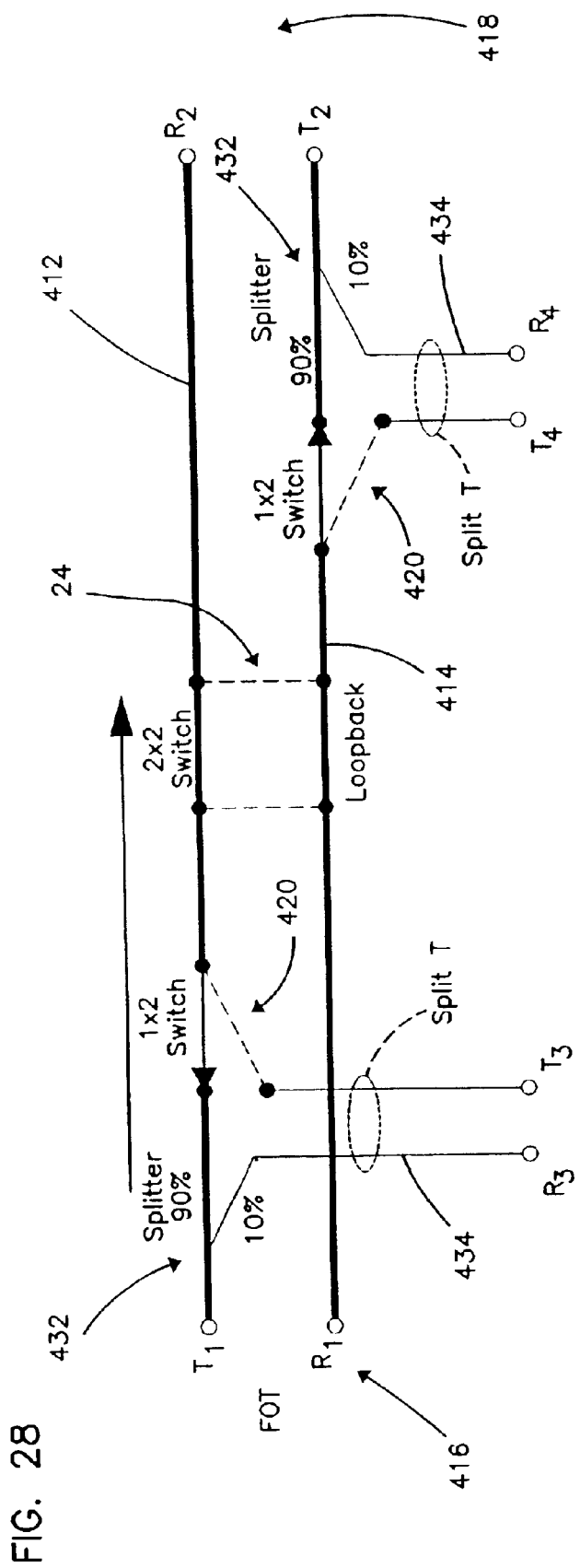
FIG. 28 is a schematic diagram of a third embodiment of a fiber optic access module including a 2×2 loopback switch, and two 1×2 split switches, one positioned in each primary signal pathway.

Referring now to FIGS. 25–27, two modules 310, 310*a* are shown cross-connected to one another in a system 308*a*. Module 310*a* is the same as module 310, except module 310*a* lacks a 2×2 switch 24. Cost savings may be realized for module 310*a* due to its simpler design with less parts. FIGS. 26 and 27 show the loopback mode of operation (FIG. 26) and the split and loopback mode of operation (FIG. 27) whereby switch 24 of module 310 is operated in order to achieve the loopback relative to module 310*a*.

Referring now to FIGS. 28–39, a further preferred embodiment of a module 410 is shown. Module 410 includes a single 2×2 switch 24 positioned between first and second signal pathways 412, 414. Signal pathways 412, 414 link a first pair of fiber optic terminals 416 with a second pair of terminals 418. Module 410 further includes a 1×2 switch 420 in each signal pathway 412, 414. Further, module 410 also includes a splitter 432 and a monitor pathway 434 linked to monitor test equipment in each signal pathway 412, 414. The 1×2 switches 420 allow for module 410 to be manufactured more inexpensively since only three switches 24, 420, 420 are provided. Module 410 is related to earlier described modules 10, 210, 212, 310, 310', 310", 310a. However, module 410 would be used instead of two of the above-noted modules which are described as being cross-connected together.

Figure 29:
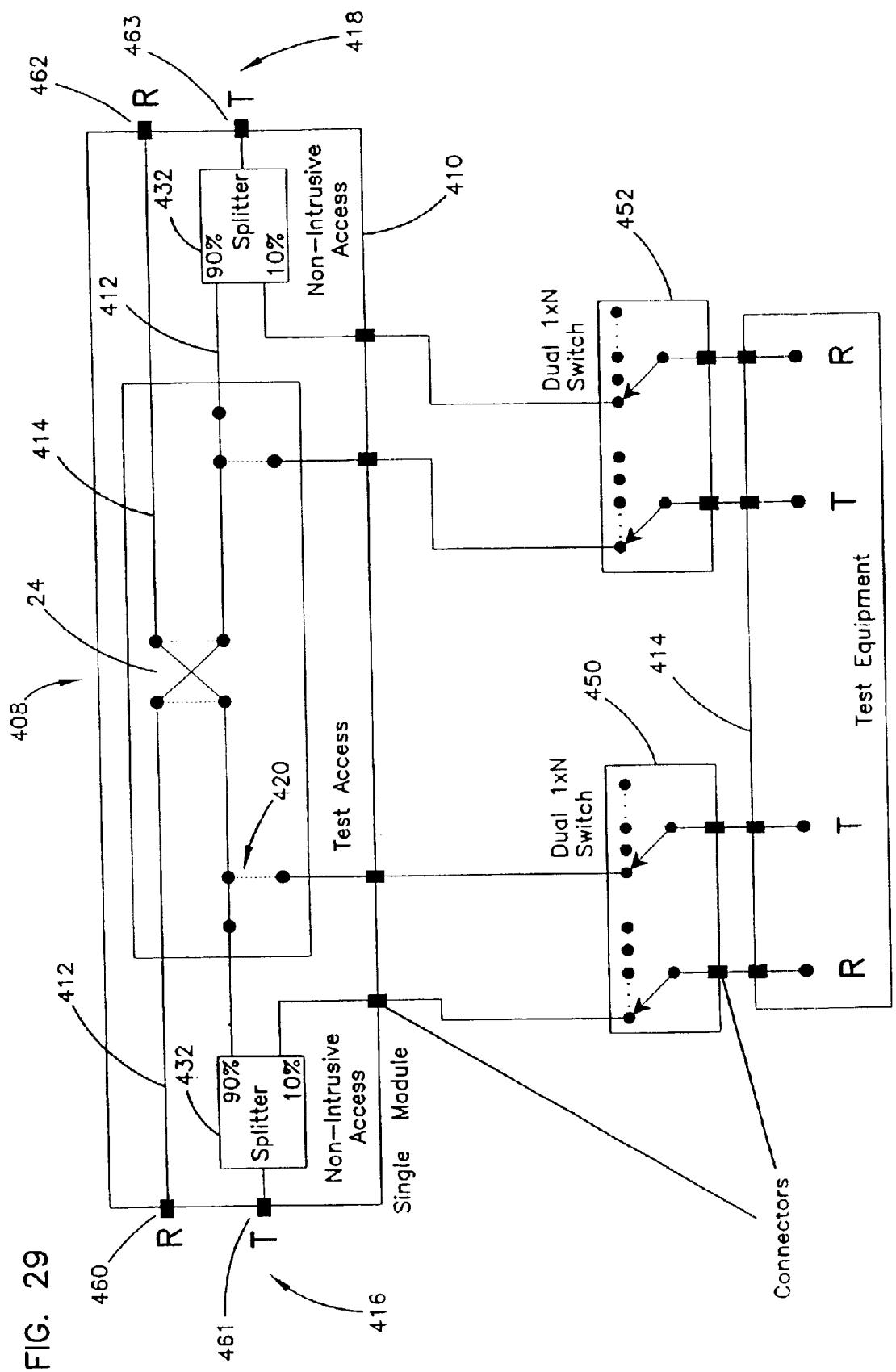
FIG. 29 shows the module of FIG. 28 connected to fiber optic test equipment.
Figure 30:
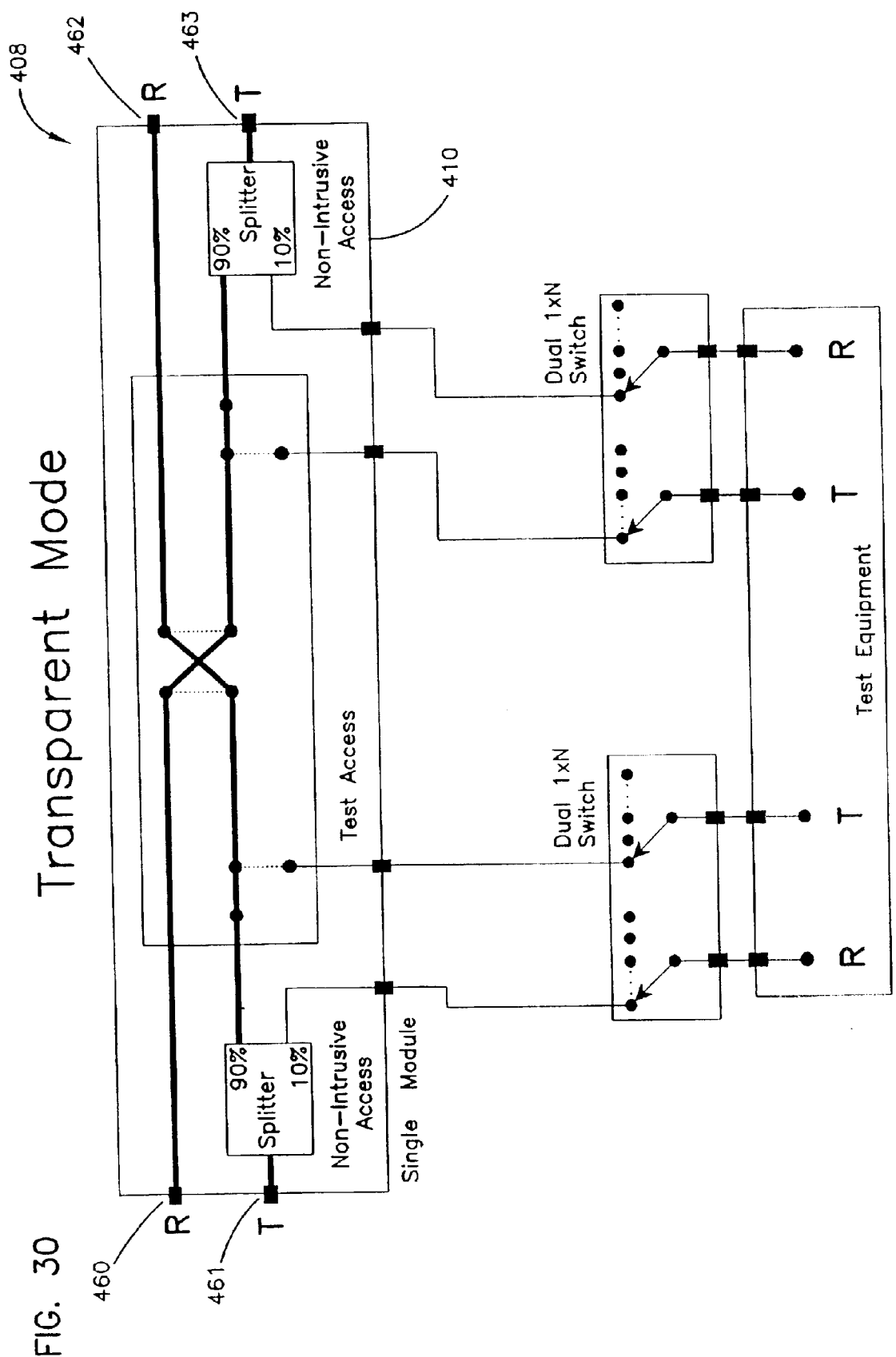
FIGS. 30–39 show various applications of the module of FIG. 29.
Figure 31:
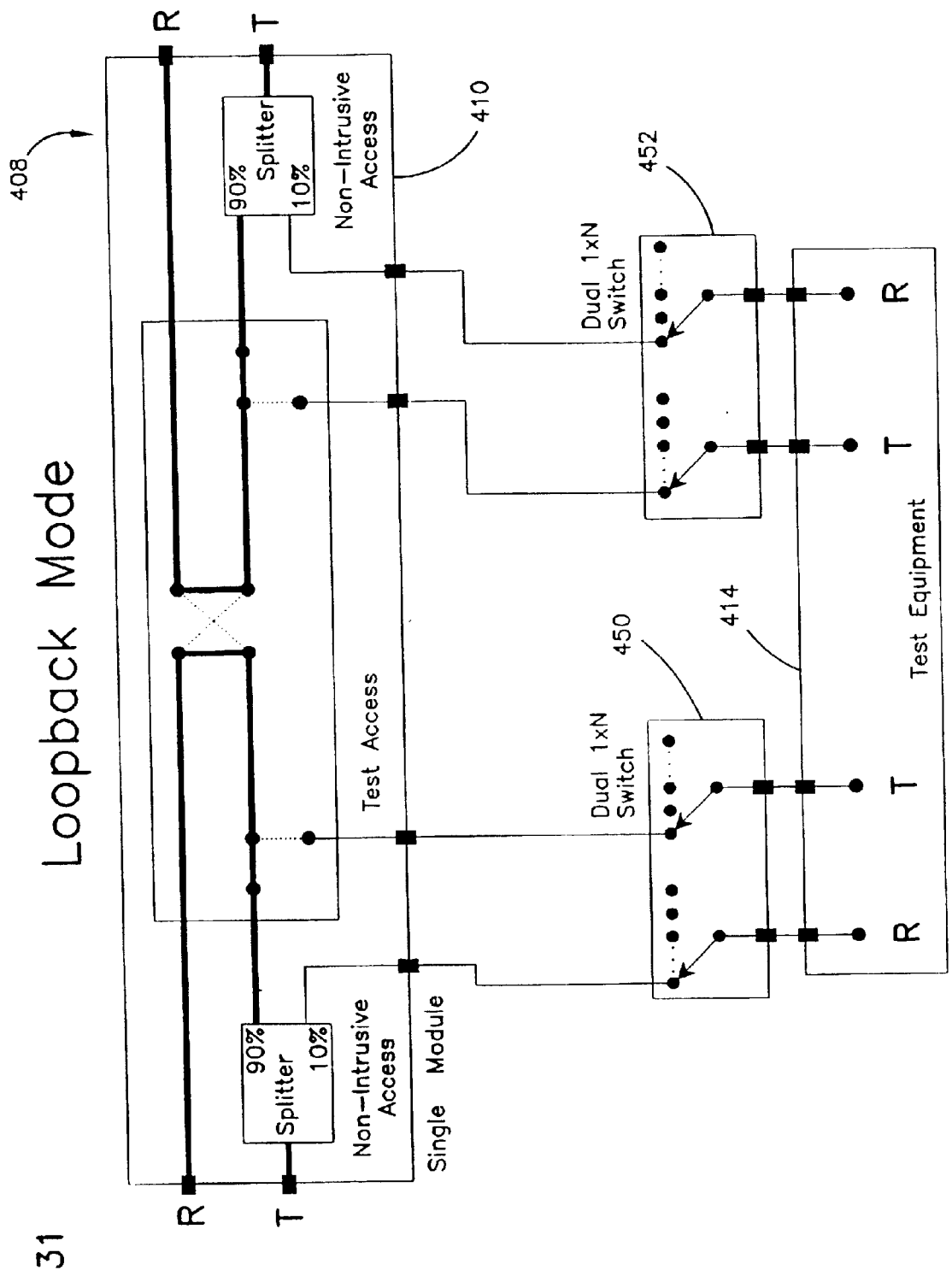
Figure 32:
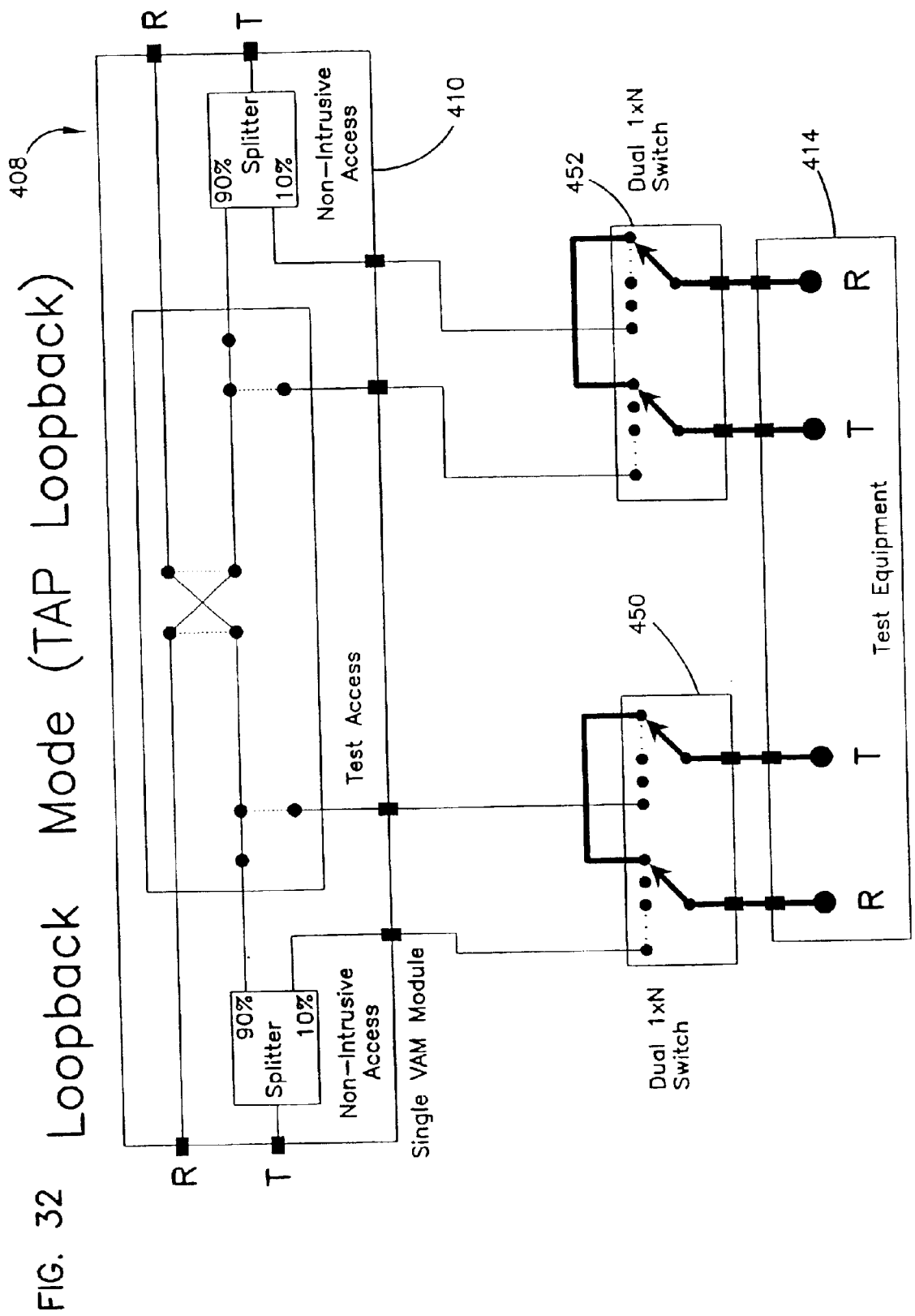
Figure 33:
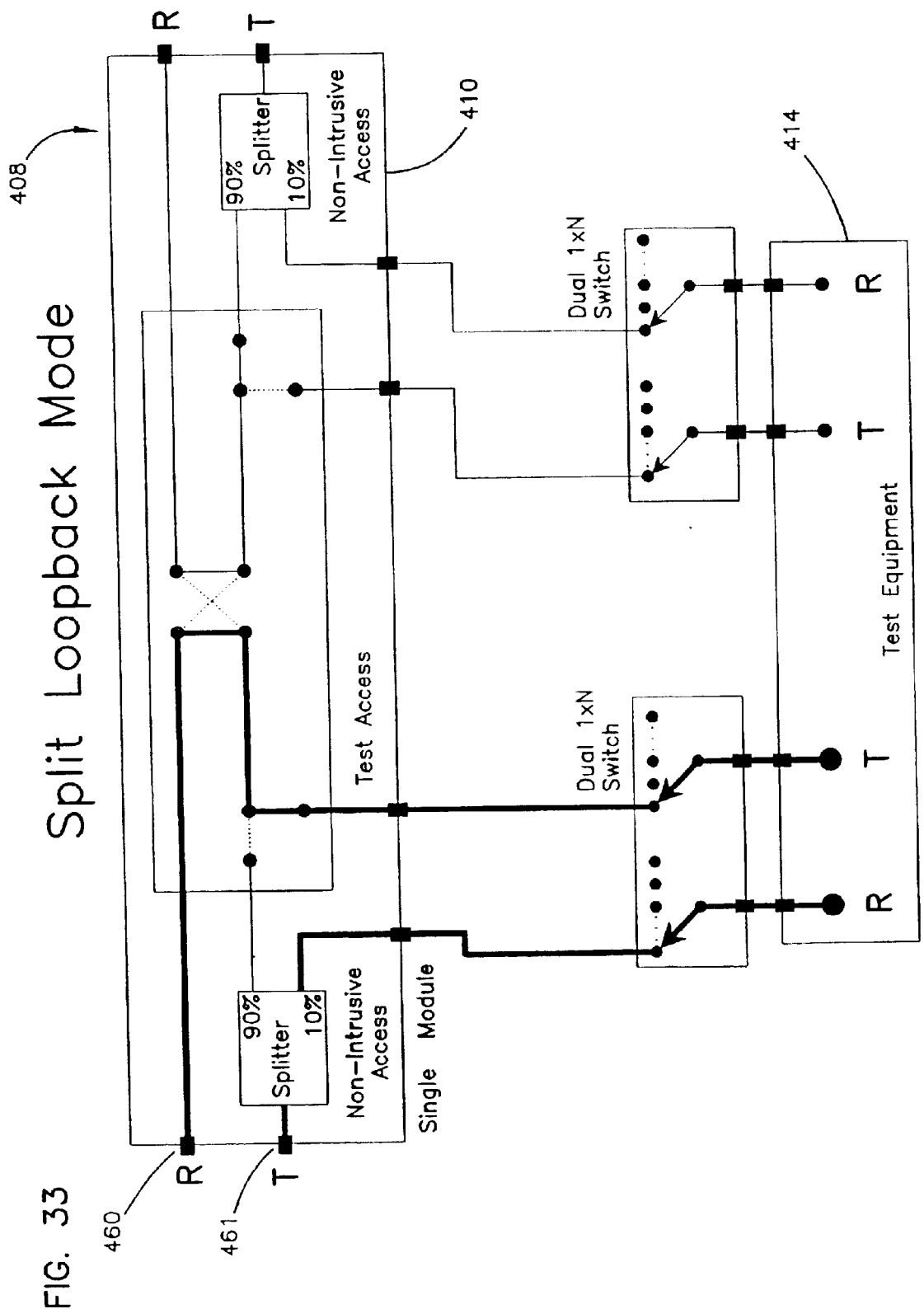
Figure 34:
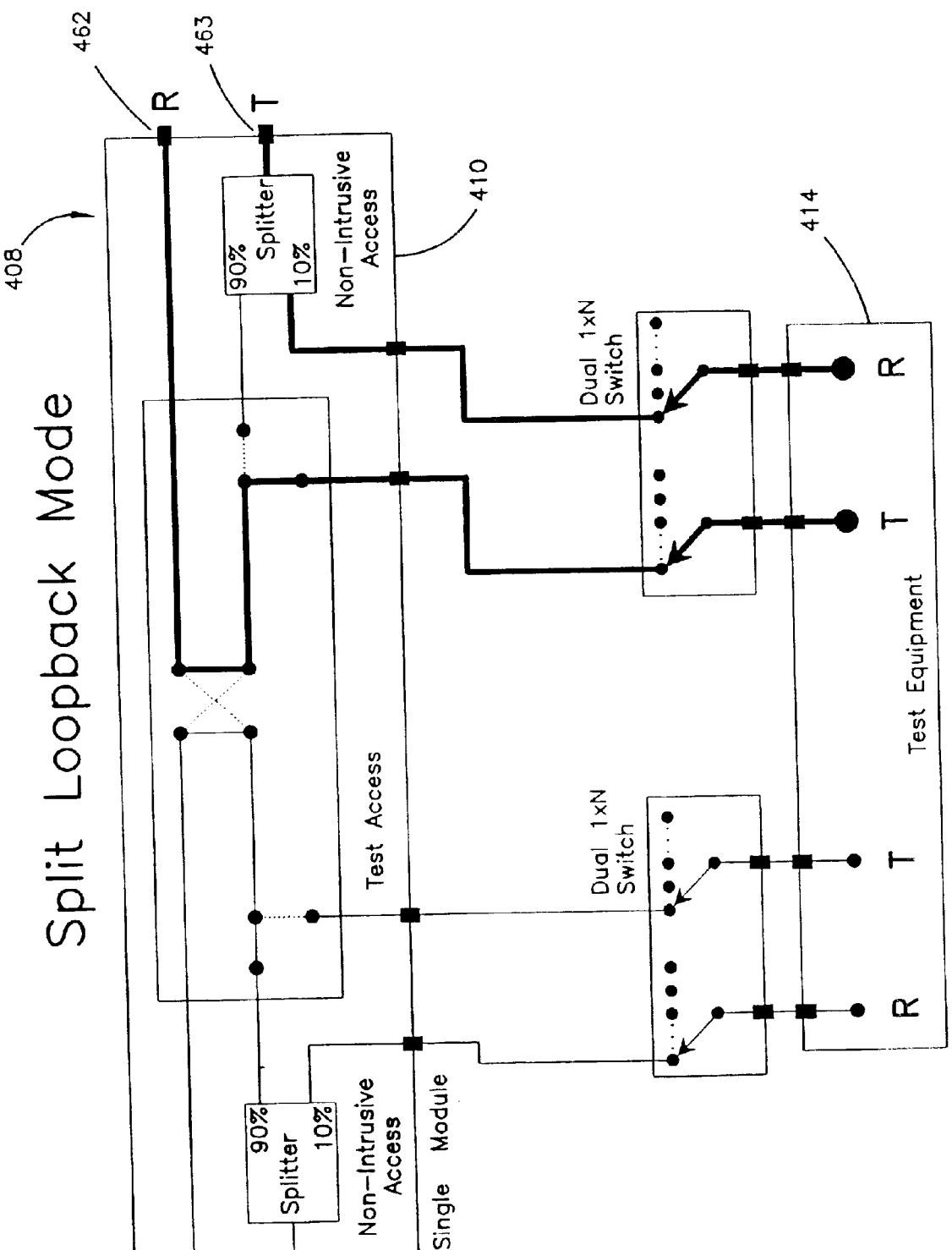
Figure 35:
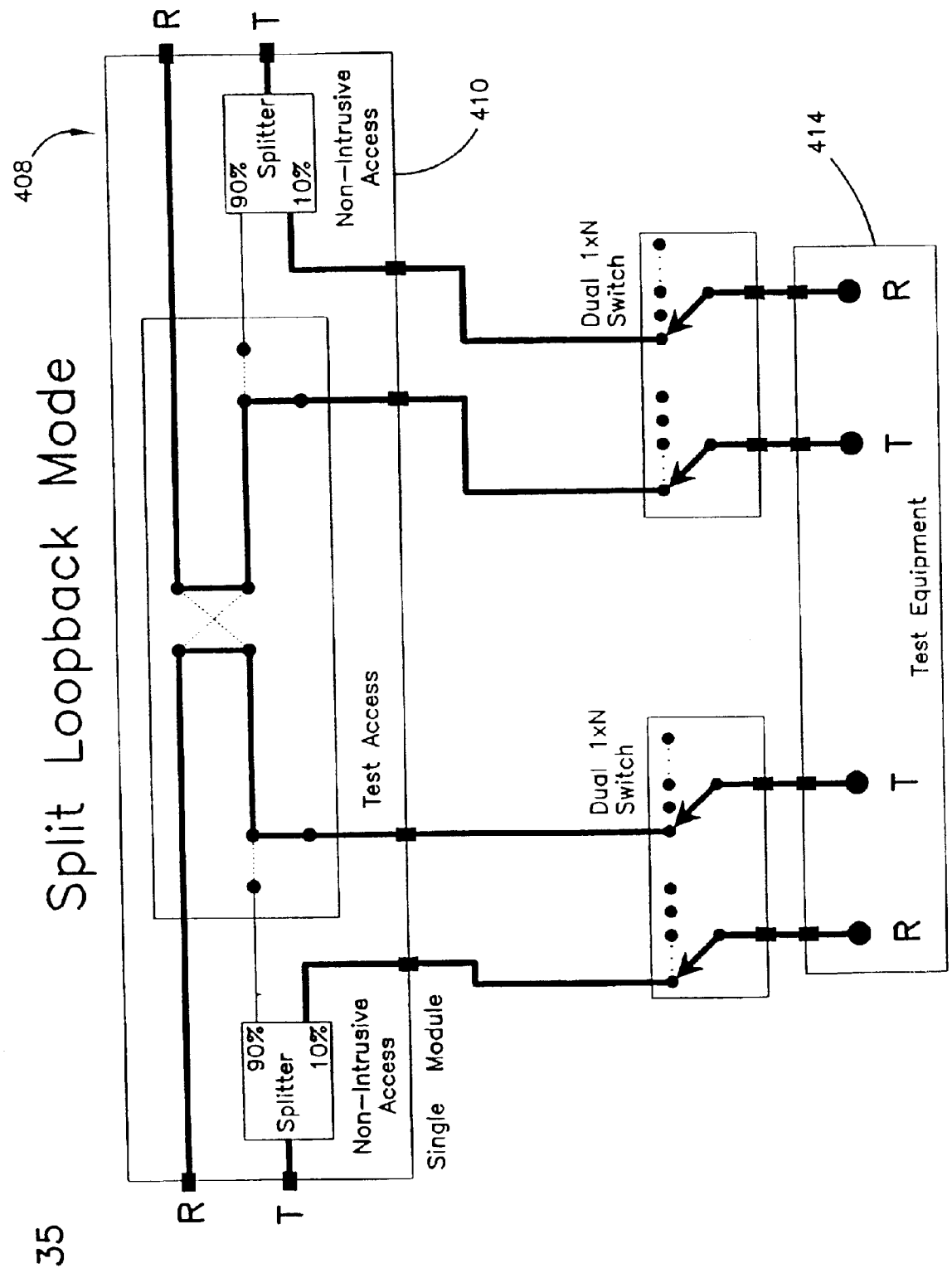
Figure 36:
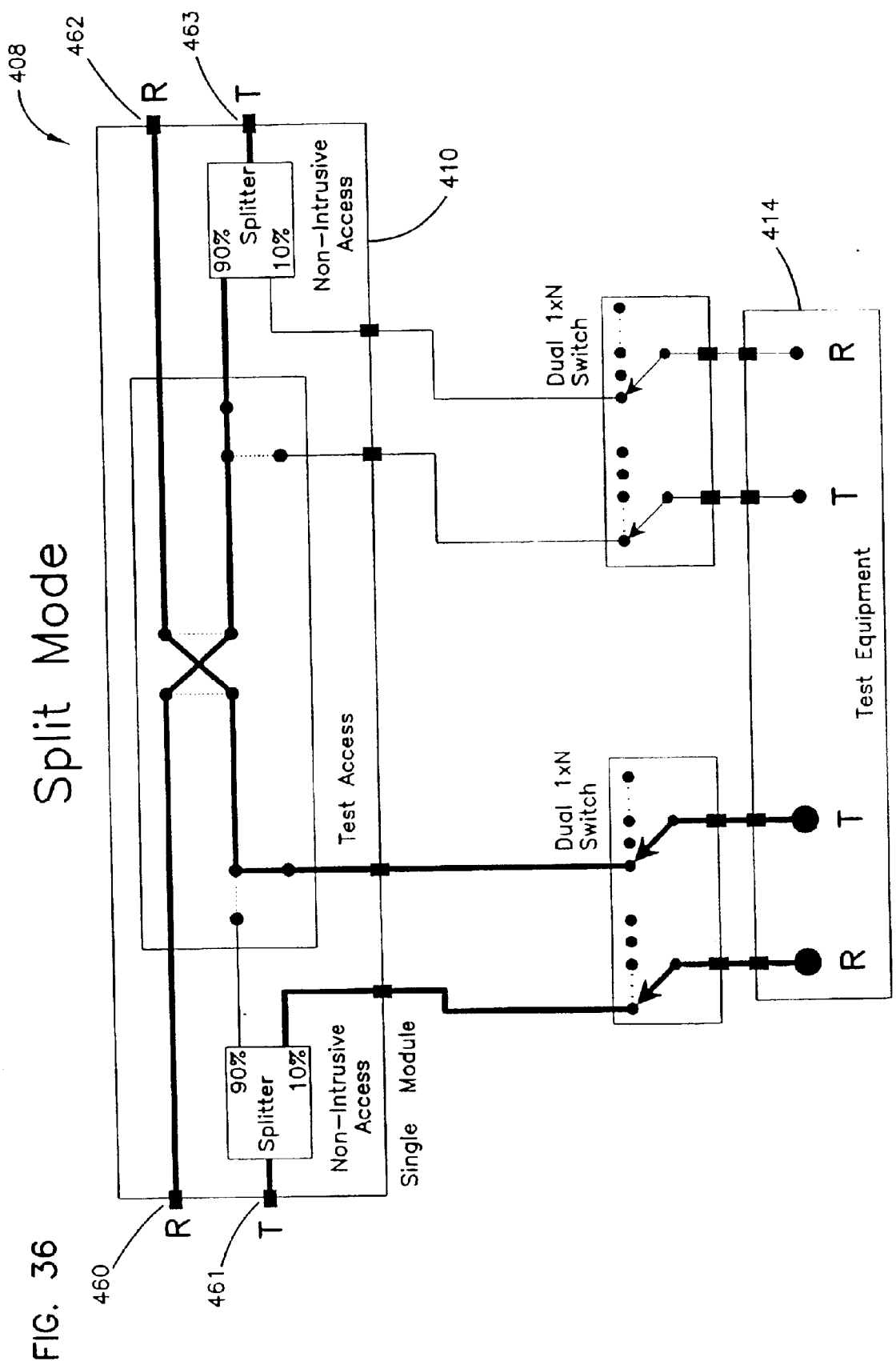
Figure 37:
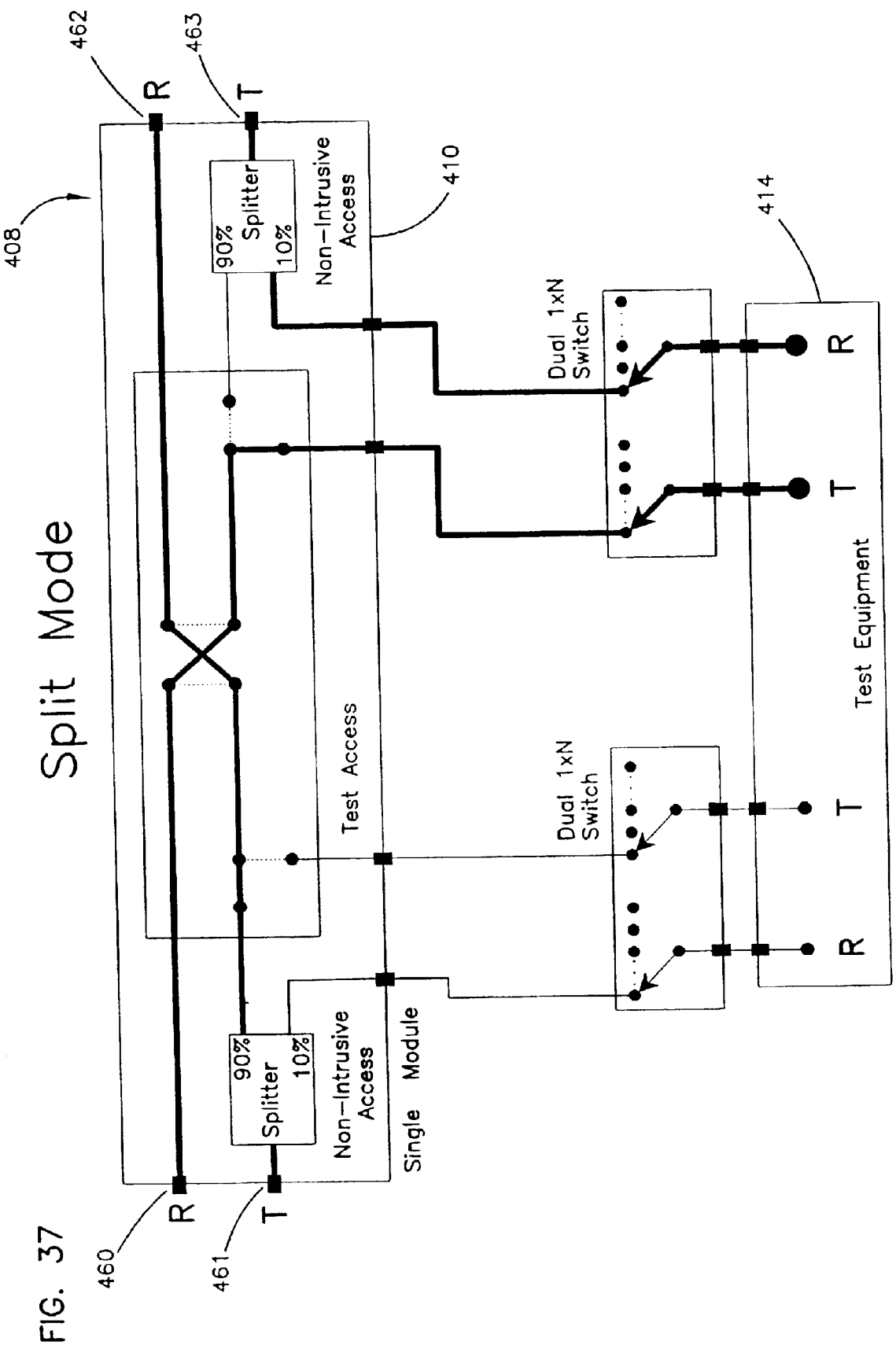
Figure 38:
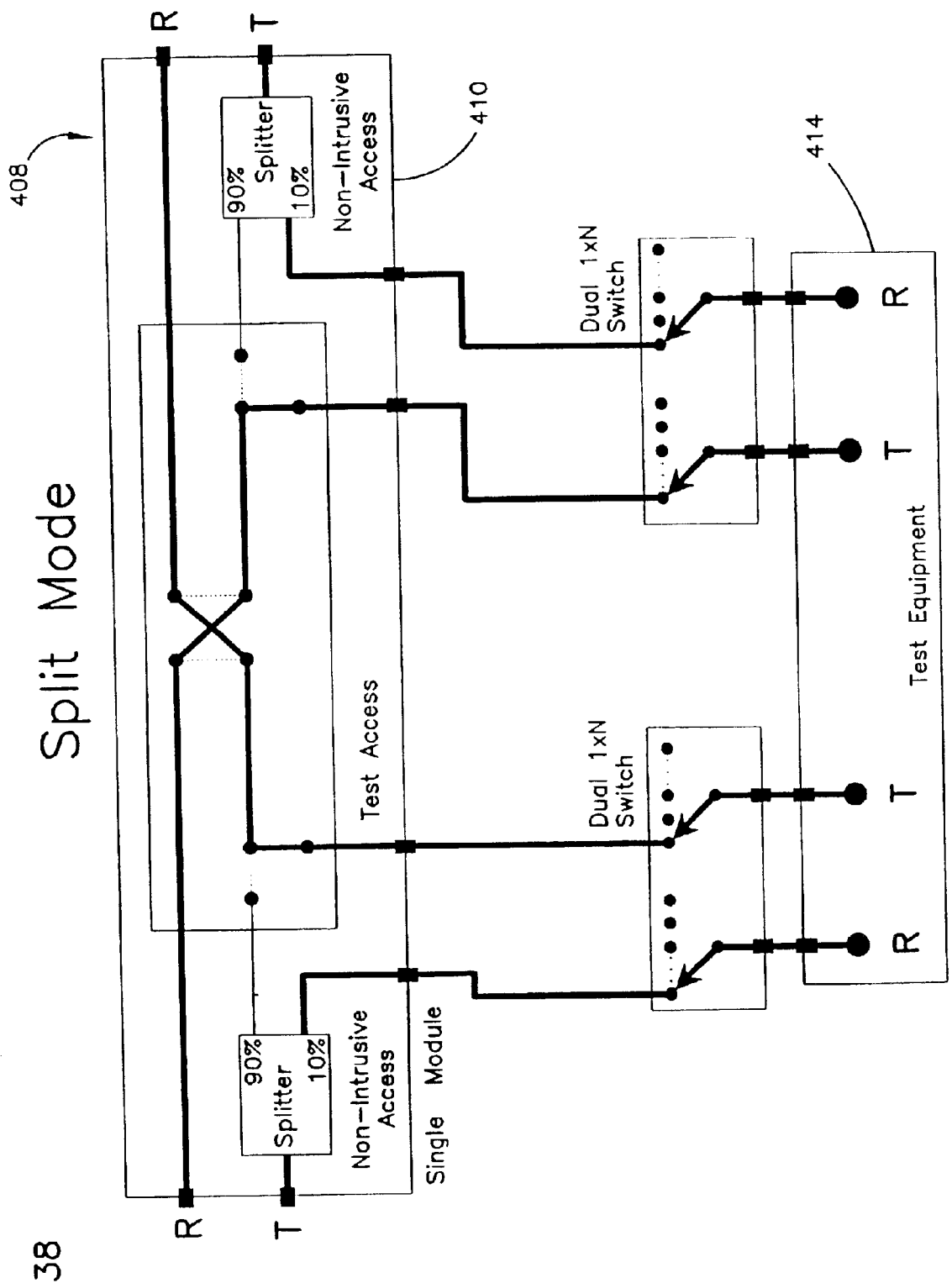
Figure 39:
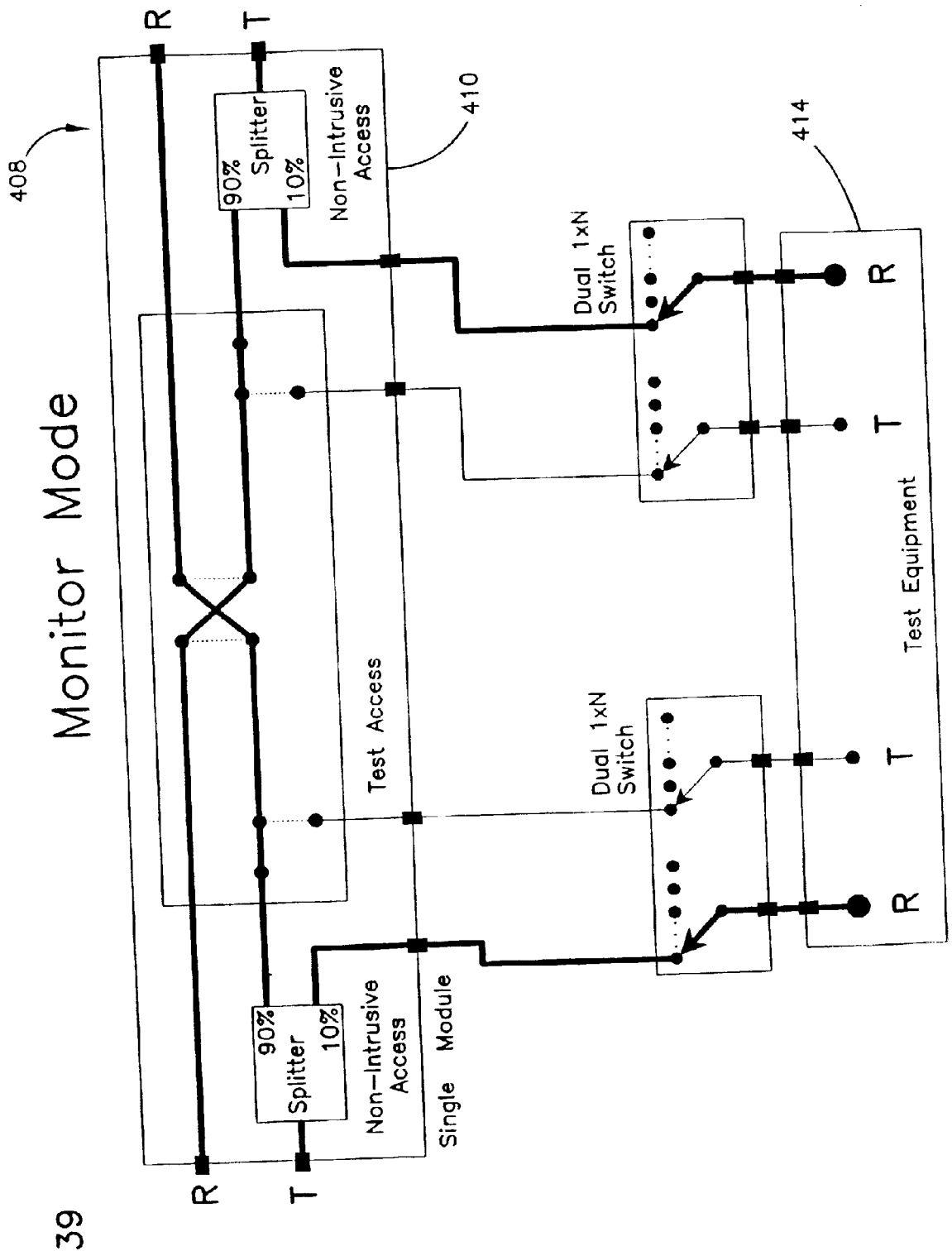

FIG. 29 shows module 410 connected to test equipment 414 and switches 450, 452 in a system 408, in a similar manner as noted above in systems 208, 308. FIGS. 30–39 show various applications of system 408 including module 410. FIG. 30 shows system 408 in the transparent mode for connection locations 460–463. FIG. 31 shows system 408 in a loopback mode for connection locations 460–463. FIG. 32 shows system 408 where the test equipment 414 is utilized in a loopback mode. A loopback circuit is provided in connection with one of the pairs of ports of each 1×N switch 450, 452. FIG. 33 shows a split and loopback mode for system 408 with respect to connection locations 460 and 461. FIG. 34 shows system 408 in a split and loop back mode with respect to connection locations 462 and 463. FIG. 35 shows system 408 where both pairs of connection locations 460 and 461, and 462 and 463 are in the split and loopback mode. FIG. 36 shows system 408 in a split mode for connection locations 460 and 461. FIG. 37 shows system 408 in a split mode with respect to connection locations 462 and 463. FIG. 38 shows system 408 where both pairs of connection locations are in a split mode. FIG. 39 shows system 408 in a monitor mode.

FIG. 29 is illustrative of a system 408 in which separate individual modules of the types described previously are not provided. Instead, the optical circuitry of system 408 may be provided in a single module 410. It is to be appreciated that the various optical circuits described above for connecting telecommunications equipment, cables, and monitor, test, and access equipment may be provided in a number of physical constructions, including the preferred modular constructions noted above. In addition, the circuitry can be provided on differently configured modules, an increased or decreased number of modules, or as part of other frames, racks, or housings associated with telecommunications and data connectivity systems. Similarly, the cross-connections noted above for individual modules, such as module 10, can be by patch cords including connectors matable with adapters of module 10, or the connections can be by other optical links which may or may not include patch cords. For example, an optical link may be provided through controller bus 204 of chassis 70 shown in FIGS. 5 and 6.

The above specification and examples provide a complete description of the manufacture and use of the invention. Since many embodiments of the invention can be made without departing from the spirit and scope of the invention, the invention resides in the claims hereinafter appended.

What is claimed is:

1. A method of monitoring fiber optics circuits which include a plurality of connection locations defining first and second pairs of connection locations defining first and second connection points, which provide a first optical signal pathway between the first connection points and a second optical signal pathway between the second connection points, further including a first switch between the first and second optical signal pathways with a normal first state with the first connection points optically linked along the first optical signal pathway, and the second connection points optically linked along the second optical signal pathway, and a second loopback pathway with the first and second connection points of the first pair in communication along a path along a portion of the first and second optical signal pathways with the first and second connection points of the second pair in communication along a second loopback path along other portions of the first and second optical signal pathways, and further including connection locations defining a third pair of connection locations optically linked with a selected one of the first and second optical signal pathways, the method comprising the following steps:
1) placing the first switch in the first state;
2) linking the third pair of connection locations to the first optical pathway, observing the optical throughput and then linking the third pair of connection locations to the second optical pathway and observing the optical throughput; and
3) repeating steps 1 and 2 as long as the first and second optical pathways transmit the optical throughput normally, otherwise placing the first switch in the second state, linking the third pair of connection locations to the first optical pathway, observing the optical throughput, then linking the third pair of connection locations to the second optical pathway and observing the optical throughput.

2. A method of monitoring fiber optics circuits which include a plurality of connection locations defining first and second pairs of connection locations defining first and second connection points, which provide a first optical signal pathway between the first connection points and a second optical signal pathway between the second connection points, further including a first switch between the first and second optical signal pathways with a normal first state with the first connection points optically linked along the first optical signal pathway, and the second connection points optically linked along the second optical signal pathway, and a second loopback pathway with the first and second connection points of the first pair in communication along a path along a portion of the first and second optical signal pathways with the first and second connection points of the second pair in communication along a second loopback path along other portions of the first and second optical signal pathways, and further including connection locations defining a third pair of connection locations optically linked to a portion of the signal to one of the first and second optical signal pathways utilizing an optical splitter, the method comprising the following steps:
1) placing the first switch in the first state;
2) linking the third pair of connection locations to the first optical pathway, observing the optical throughput and then linking the third pair of connection locations to the second optical pathway and observing the optical throughput; and
3) repeating steps 1 and 2 as long as the first and second optical pathways transmit the optical throughput normally, otherwise placing the first switch in the second state, linking the third pair of connection locations to the first optical pathway, observing the optical throughput, then linking the third pair of connection locations to the second optical pathway and observing the optical throughput.

3. A method of monitoring fiber optics circuits including a plurality of connection locations defining first and second transmit signal connection locations and first and second receive signal connection locations, a transmit signal pathway between the first and second transmit signal connection locations, a receive signal pathway between the first and second receive signal connection locations, a first switch between the transmit and receive signal pathways with the switch having a first normal through state with the first and second transmit signal connection locations optically linked along the transmit signal pathway, and with the first and second receive signal connection locations optionally linked along the receive signal pathway; and a second loopback pathway with the first transmit signal connection location and the first receive signal connection location in communication along a loopback path along a portion of the transmit and receive signal pathways, and with the second transmit signal connection location and the second receive signal connection location in communication along a second loopback path along other portions of the transmit and receive signal pathways, and including the plurality of connection locations defining a third signal connection location optically linkable through a second switch with one of the transmit and receive signal pathways, and further including a remote controller for controlling operation of the first and second switches, optical links between the second transmit and receive signal connection locations of pairs of accessible circuits, and a central controller and network connecting the remote controllers, the method comprising the following steps:
1) utilizing the remote controller to place the first switch in the first state and place the second switch with the third pair of connection locations linked to the first optical pathway and then observe the optical throughput;
2) utilizing the remote controller to place the second switch with the third pair of connection locations linked to the second optical pathway, then observing the optical throughput; and
3) repeating steps 1 and 2 as long as both the first and second optical pathways transmit the optical throughput normally, otherwise utilizing the remote controller to place the first switch in the second state and to place the second switch with the third pair of connection locations linked to the first optical pathway and then observing the optical throughput, then utilizing the remote controller to place the second switch with the third pair of connection locations linked to the second optical pathway, then observing the optical throughput.

4. A method of monitoring fiber optics circuits including a plurality of connection locations defining first and second transmit signal connection locations and first and second receive signal connection locations, a transmit signal pathway between the first and second transmit signal connection locations, a receive signal pathway between the first and second receive signal connection locations, a first switch between the transmit and receive signal pathways with the switch having a first normal through state with the first and second transmit signal connection locations optically linked along the transmit signal pathway, and with the first and second receive signal connection locations optically linked along the receive signal pathway; and a second loopback pathway with the first transmit signal connection location and the first receive signal connection location in communication along a loopback path along a portion of the transmit and receive signal pathways, and with the second transmit signal connection location and the second receive signal connection location in communication along a second loopback path along other portions of the transmit and receive signal pathways, and including the plurality of connection locations defining a third signal connection location optically linked by an optical splitter to a portion of the signal obtained through a second switch with one of the transmit and receive signal pathways, and further including a remote controller for controlling operation of the first and second switches, optical links between the second transmit and receive signal connection locations of pairs of accessible circuits, and a central controller and network connecting the remote controllers, the method comprising the following steps:
1) utilizing the remote controller to place the first switch in the first state and place the second switch with the third pair of connection locations linked to the first optical pathway and then observe the optical throughput;
2) utilizing the remote controller to place the second switch with the third pair of connection locations linked to the second optical pathway, then observing the optical throughput; and
3) repeating steps 1 and 2 as long as both the first and second optical pathways transmit the optical throughput normally, otherwise utilizing the remote controller to place the first switch in the second state and to place the second switch with the third pair of connection locations linked to the first optical pathway and then observing the optical throughput, then utilizing the remote controller to place the second switch with the third pair of connection locations linked to the second optical pathway, then observing the optical throughput.

5. A method of monitoring fiber optics circuits which include a plurality of accessible optical circuits each with number of connection locations which define first and second transmit signal connection locations and first and second receive signal connection locations, a transmit signal pathway between the first and second transmit signal connection locations, a receive signal pathway between the first and second receive signal connection locations, a first switch between the transmit and receive signal pathways with the switch having a first normal state where the first and second transmit signal connection locations are optically linked along the transmit signal pathway, and where the first and second receive signal connection locations are optically linked along the receive signal pathway, and a second loopback pathway where the first transmit signal connection location and the first receive signal connection location are in communication along a first loopback path along a portion of the transmit and receive signal pathways, and where the second transmit signal connection location and the second receive signal connection location are in communication along a second loopback path along other portions of the transmit and receive signal pathways, and where the plurality of connection locations define a third signal connection location optically linkable through a second switch with one of the transmit and receive signal pathways, a remote controller controlling operation of the first and second switches, optical links between the second transmit and receive signal connection locations of pairs of accessible circuits and a central controller and network connecting the remote controllers, with the method comprising the following steps:

1) linking the third signal connection locations to the first transmit signal connection locations and the first receive signal connection locations and utilizing the central controller to place the first switch in the first state and observing the optical throughput;

2) linking third signal connection locations to the second transmit signal connection locations and the second receive signal locations and observing the optical throughput; and 3) repeating steps 1 and 2 as long as both the first and second optical pathways transmit the optical throughput normally, otherwise linking the third pair of connection locations to the first transmit signal connection locations and the first receive signal connection locations and utilizing the remote controller to place the first switch in the second state and observing the optical throughput, then linking the third pair of connection locations to the second transmit signal connection locations and the second receive signal connection locations and observing the optical throughput.

6. A method of monitoring fiber optics circuits which include a plurality of accessible optical circuits each with number of connection locations which define first and second transmit signal connection locations and first and second receive signal connection locations, a transmit signal pathway between the first and second transmit signal connection locations, a receive signal pathway between the first and second receive signal connection locations, a first switch between the transmit and receive signal pathways with the switch having a first normal state where the first and second transmit signal connection locations are optically linked along the transmit signal pathway, and where the first and second receive signal connection locations are optically linked along the receive signal pathway, and a second loopback pathway where the first transmit signal connection location and the first receive signal connection location are in communication along a first loopback path along a portion of the transmit and receive signal pathways, and where the second transmit signal connection location and the second receive signal connection location are in communication along a second loopback path along other portions of the transmit and receive signal pathways, and where the plurality of connection locations define a third signal connection location optically linkable through an optical splitter to a portion of the signal selected through a second switch with one of the transmit and receive signal pathways, a remote controller controlling operation of the first and second switches, optical links between the second transmit and receive signal connection locations of pairs of accessible circuits and a central controller and network connecting the remote controllers, with the method comprising the following steps:

1) linking the third signal connection locations to the first transmit signal connection locations and the first receive signal connection locations and utilizing the central controller to place the first switch in the first state and observing the optical throughput;

2) linking third signal connection locations to the second transmit signal connection locations and the second receive signal locations and observing the optical throughput; and 3) repeating steps 1 and 2 as long as both the first and second optical pathways transmit the optical throughput normally, otherwise linking the third pair of connection locations to the first transmit signal connection locations and the first receive signal connection locations and utilizing the remote controller to place the first switch in the second state and observing the optical throughput, then linking the third pair of connection locations to the second transmit signal connection locations and the second receive signal connection locations and observing the optical throughput.

\* \* \* \* \*